(12) United States Patent
Tanaka et al.

(10) Patent No.: US 7,342,617 B2
(45) Date of Patent: Mar. 11, 2008

(54) LIQUID CRYSTAL DISPLAY COMPRISING AN ELECTROSTATIC PROTECTION ELEMENT FORMED BETWEEN ADJACENT BUS LINES

(75) Inventors: Yoshinori Tanaka, Kawasaki (JP); Tetsuya Fujikawa, Kawasaki (JP); Yasuhiro Nasu, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/602,848

(22) Filed: Jun. 24, 2003

(65) Prior Publication Data

US 2004/0027502 A1   Feb. 12, 2004

Related U.S. Application Data

(62) Division of application No. 09/607,104, filed on Jun. 29, 2000, now Pat. No. 6,914,643.

(30) Foreign Application Priority Data

Aug. 31, 1999   (JP) .................................. 11-244468

(51) Int. Cl.
  *G02F 1/1333* (2006.01)
  *G02F 1/1343* (2006.01)
(52) U.S. Cl. ........................................ 349/40; 349/147
(58) Field of Classification Search ................ 349/40, 349/147
  See application file for complete search history.

(56) References Cited

U.S. PATENT DOCUMENTS 5,019,001 A * 5/1991 Abe et al. ...................... 445/3

5,068,748 A * 11/1991 Ukai et al. .................... 349/40

(Continued)

FOREIGN PATENT DOCUMENTS

JP   6179259   4/1986

(Continued)

*Primary Examiner*—Andrew Schechter
*Assistant Examiner*—W. Patty Chen
(74) *Attorney, Agent, or Firm*—Greer, Burns & Crain, Ltd.

(57) ABSTRACT

The present invention relates to a liquid crystal display provided with an electrostatic protection element and an object of the present invention is to provide the liquid crystal display provided with superior redundancy and at the same time a sufficient protection function against static electricity in which relatively low voltage generates for a long period of time. Electrostatic protection element sections 28 and 30 are provided with a first TFT 32 having a source electrode (S) and a drain electrode (D) where the source electrode (S) is connected to external output electrodes 16 and 18 and the drain electrode (D) is connected to common wirings 22 and 24, a second TFT 38 having a conductor 42, a source electrode (S), a drain electrode (D) and a gate electrode (G) where the conductor 42 is connected to the gate electrode (G) of the first TFT 32, the source electrode (S) is connected to the external output electrodes 16 and 18, the drain electrode (D) is connected to the conductor 42 and the gate electrode (G) is electrically floated, and a third TFT 40 having a source electrode (S), a drain electrode (D) and a gate electrode (G) where the source electrode (S) is connected to the common wirings 22 and 24, the drain electrode (D) is connected to the conductor 42 and the gate electrode is electrically floated.

5 Claims, 28 Drawing Sheets

U.S. PATENT DOCUMENTS

| | | | | |
|---|---|---|---|---|
| 5,444,022 A | * | 8/1995 | Gardner | 438/627 |
| 5,650,834 A | * | 7/1997 | Nakagawa et al. | 349/139 |
| 5,668,032 A | * | 9/1997 | Holmberg et al. | 438/149 |
| 5,691,787 A | * | 11/1997 | Shimada et al. | 349/40 |
| 5,781,253 A | * | 7/1998 | Koike et al. | 349/40 |
| 5,835,177 A | * | 11/1998 | Dohjo et al. | 349/147 |
| 5,909,035 A | | 6/1999 | Kim | |
| 5,926,234 A | * | 7/1999 | Shiraki et al. | 349/40 |
| 5,930,607 A | * | 7/1999 | Satou | 438/158 |
| 5,973,658 A | * | 10/1999 | Kim et al. | 345/92 |
| 6,043,971 A | * | 3/2000 | Song et al. | 361/111 |
| 6,087,678 A | * | 7/2000 | Kim | 257/59 |
| 6,104,449 A | * | 8/2000 | Takahashi et al. | 349/40 |
| 6,184,966 B1 | * | 2/2001 | Fujita et al. | 349/152 |
| 6,211,534 B1 | * | 4/2001 | Matsumoto | 257/59 |
| 6,337,722 B1 | | 1/2002 | Ha | |
| 6,380,559 B1 | * | 4/2002 | Park et al. | 257/59 |
| 6,411,348 B2 | * | 6/2002 | Kawai et al. | 349/40 |
| 6,587,160 B2 | * | 7/2003 | Lee et al. | 349/40 |
| 6,678,017 B1 | * | 1/2004 | Shimomaki et al. | 349/40 |
| 6,683,662 B2 | * | 1/2004 | Fujita et al. | 349/43 |
| 6,710,824 B2 | * | 3/2004 | Suzuki et al. | 349/40 |
| 6,734,925 B1 | * | 5/2004 | Lee et al. | 349/40 |

FOREIGN PATENT DOCUMENTS

| | | |
|---|---|---|
| JP | 05-198806 | 8/1993 |
| JP | 10-268794 | 10/1998 |

* cited by examiner

F I G. 25
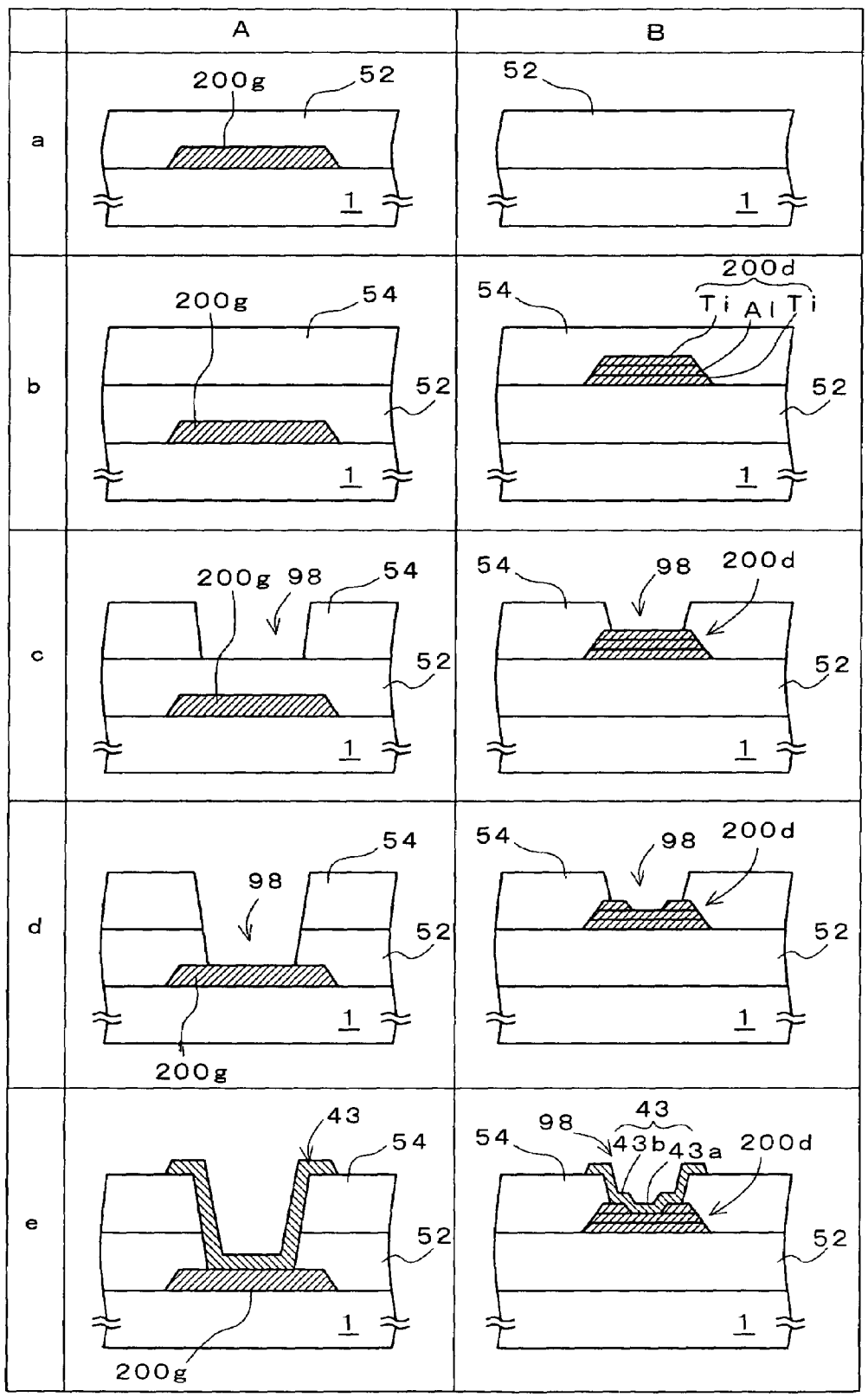

LIQUID CRYSTAL DISPLAY COMPRISING AN ELECTROSTATIC PROTECTION ELEMENT FORMED BETWEEN ADJACENT BUS LINES

This is a divisional of application Ser. No. 09/607,104, filed Jun. 29, 2000 now U.S. Pat. No. 6,914,643.

BACKGROUND OF THE INVENTION

1. Field of the Invention

The present invention relates to an active matrix type liquid crystal display provided with a thin film transistor (hereinafter, referred to as TFT) as a switching element, and specifically relates to the liquid crystal display provided with an electrostatic protection element protecting the TFT formed on a substrate on an array side and areas between bus lines from a destruction or a shortage due to static electricity.

2. Description of the Related Art

The active matrix type LCD is widely used in computers or equipment for the use of OA (Office Automation) as a flat panel display providing superior picture quality. In this active matrix type LCD, a voltage is applied from both electrodes to a liquid crystal layer sealed between the substrate on the array side forming a TFT and pixel electrode and an opposing substrate forming common, thereby driving the liquid crystal display.

A plurality of gate bus lines to which a scanning signal is sequentially input to select a driving display pixel are formed in parallel to each other on the substrate on the array side. Further, an insulation film is formed on the plurality of gate bus lines, and a plurality of data bus lines substantially orthogonal to the gate bus lines are formed on an insulation film. Each area decided by the plurality of gate bus lines and the plurality of data bus lines formed orthogonal to each other in a matrix shape becomes a pixel area, and the TFT and the display electrode are formed in each pixel area. A gate electrode of the TFT is connected to a predetermined gate bus line, a drain electrode is connected to a predetermined data bus line, and a source electrode is connected to the display electrode in the pixel area.

Incidentally, since the TFT for controlling the operation of liquid crystal of the TFT-LCD, gate bus lines, data bus lines and the like are formed on the glass substrate which is an insulation material, the TFT, gate bus lines, data bus lines and the like are basically weak against static electricity. Therefore, if static electricity is generated on the substrate on the array side during a period from the substrate process on the array side constructing the TFT to the panel process sealing liquid crystal by attaching the substrate on the array side and the opposing substrate and mounting a driver IC and the like, defects such as a destruction of the TFT, a change in characteristics of the TFT, a shortage between each of the bus lines are generated, thereby resulting in a considerable reduction in fabrication yield of panels. Thus, a reliable measure to protect the elements and the bus lines on the substrate on the array side from static electricity is required.

As a measure to protect the substrate on the array side from static electricity, for example, a method connecting all the bus lines to a common electrode (short ring) to keep the same potential is known. The short ring is formed by materials for the data bus lines or the gate bus lines when the data bus lines or the gate bus lines are formed. Thus, each bus line is electrically connected with the value of resistance less than several kΩ. Therefore, even if a specific area on the panel is charged with electricity, the electric charges are instantly dispersed, thereby preventing the TFT in a display from a device destruction or a change in characteristics.

However, according to this method, since each bus line is short-circuited to each other, an independent signal can not be applied to each bus line. Therefore, a problem occurs, in which an array inspection (a TFT inspection) performing a characteristic test of the TFT of each pixel by detecting the amount of electric charges when the electric charges are kept between the pixel electrode and the common electrode in the display panel can not be performed. Further, since the short ring electrically connects the adjacent bus lines at low resistance, the short ring is required to be removed either in the panel process or in the unit assembling process after the panel is completed. Thus, a problem exists in which a measure against static electricity is not taken in the processes after the unit assembling process.

Accordingly, a method of arranging a resistive component between the short ring and each bus line is conceived. FIG. 28 is a diagram describing the conventional technology connecting the resistive component between the bus line and the short ring, which is disclosed in the publication of Japanese Laid Open Patent Application No. 8-101397. FIG. 28 shows a part of a substrate surface on the array side and a resistance layer 400 is formed by patterning an ITO (indium tin oxide) formed on a gate metal or on a drain metal into a zigzag line at the end portion of a bus line 504. A tip of the zigzag-shape resistance layer 400 is connected to a short ring 506. The array inspection is possible according to this structure. Normally, this resistance layer 400 and the short ring 506 are removed by disconnecting a scribe line SL shown by the dotted line in the diagram in the panel scribe process when assembling the panel.

However, according to this method, in order to obtain a higher resistance using ITO, an area is required to secure the distance of the zigzag-shape. Thus, a problem that an external size of the panel becomes large exists.

Besides the methods described above, a method for inserting an electrostatic protection element such as a transistor and the like between the bus line and the short ring is conceived. For example, in the publication of Japanese Laid Open Patent Application No. 61-79259, a method of connecting the gate electrode and the source/drain electrode by a capacitive coupling is shown.

FIGS. 29a and 29b are diagrams describing the conventional technology shown in the publication of Japanese Laid Open Patent Application No. 61-79259. FIG. 29a shows a state of a part of the substrate on the array side when viewing toward the substrate and FIG. 29b shows a cross section of the electrostatic protection element. As shown in FIG. 29a, an electrostatic protection element 500 has a TFT structure arranged between an external output electrode 504 at the end portion of a bus line 502 and the short ring 506. The electrostatic protection element 500 is formed by the same process as the TFT formed in the pixel area on a glass substrate 508. As shown in FIG. 29b, a gate electrode 510 is formed on the glass substrate 508 and an operating semiconductor layer 514 composed of, for example, amorphous silicon (hereinafter, abbreviated as a-Si) is formed on the gate electrode 510 via a gate insulation film 512. A protection film 520 is formed on the operating semiconductor layer 514 and a source electrode 518 and a drain electrode 516 are formed on both sides of the operating semiconductor layer 514 sandwiching the protection film. The drain electrode 516 is connected to the short ring 506 and the source electrode 518 is connected to the external output electrode 504. When viewing to the direction of the substrate surface, the gate electrode 510 has a plane overlapping with the source/drain electrodes 518 and 516 and is connected with the source/drain electrodes 518 and 516 by capacitive coupling. Therefore, when high voltage is generated due to static electricity between the source/drain electrodes 518 and 516, since the potential of the gate electrode 510 becomes the middle of the potential difference generated between the source/drain electrodes 518 and 516, a channel is created at the operating semiconductor layer 514, thereby releasing the electric load due to static electricity from the bus line 502.

However, since the structure of this electrostatic protection element 500 has a single structuring element, the redundancy is poor. In other words, since high voltage due to static electricity is received by only one TFT, the electrostatic protection element 500 is easily destroyed and when the area between the bus line 502 and the short ring 506 is insulated due to the destruction, the possibility of the TFT in the pixel area to be exposed to static electricity increases. Further, even if irregularities due to static electricity do not occur, if the electrostatic protection element 500 is short-circuited due to some reason, a TFT test can not be performed.

Next, the electrostatic protection circuit having more redundancy than the structure shown in FIGS. 29a and 29b which is disclosed in the publication of Japanese Laid Open Patent Application No.10-303431 is described with reference to FIG. 30. The source electrode (S) of the first TFT 530 which is the electrostatic protection element is connected to an external output electrode 502 of the bus line, and the drain electrode (D) on the other side is connected to the short ring 506. The gate electrode (G) of the first TFT 530 is connected to a conductor 536 which is electrically floated from both the external output electrode 502 and the short ring 506. On the other hand, the source electrode (S) and the gate electrode (G) of the second TFT 532 are connected to the external output electrode 502 of the bus line and the drain electrode (D) on the other side is connected to the conductor 536. Further, the drain electrode (D) of the third TFT 534 is connected to the conductor 536 and the source electrode (S) and the gate electrode (G) on the other side are connected to the short ring 506. When positive high voltage is generated in the bus line with respect to the short ring 506 due to static electricity, high voltage is applied to the gate electrode (G) of the second TFT 532 and a channel is formed, thereby rapidly increasing the conductivity. On the other hand, since the gate electrode (G) of the third TFT 534 is connected to the short ring 506, a channel is not formed and the conductivity remains to be very small. This difference in conductivity is very large, and in consequence, the potential of the conductor 536 is substantially equal to the potential of the bus line. As a result, a channel is formed by applying the voltage between the bus line and the short ring 506 at the gate electrode of the first TFT 530 which is the electrostatic protection element and the electric charge can be released. It will be noted that the second and the third TFT's 532 and 534 do not basically run the current and are used only to control the gate potential of the first TFT 530.

In this manner, in the above electrostatic protection circuit, since the gate electrodes of the second and the third TFT's 532 and 534 are connected to the external output electrode 502 of the bus line or the short ring 506, the potential difference between the external output electrode 502 and the short ring 506 is instantly liquidated. However, when the voltage generated by static electricity reduces as the time passes, the potential of the conductor 536 also reduces and the conductivity of the first TFT 530 reduces.

Thus, when the voltage is relatively low (~ several volts) due to static electricity, the efficiency of releasing the electric charges is reduced.

Also, based on the previous fabrication experiences, obstacles due to static electricity are known to occur by sharp pulse-like static electricity at extremely high voltage for a short period of time and static electricity continuously applied to each element for a long period of time even if the voltage is relatively low. Therefore, although the electrostatic protection circuit described in the publication of Japanese Laid Open Patent Application No. 10-303431 can be expected to be effective in the former case, little result is expected in the latter case as the path for the current to escape is cut off when the voltage is reduced to a certain extent. Further, according to the electrostatic protection circuit described in the above publication, since the current due to static electricity all flows in the first TFT, the redundancy is poor and the load is exceedingly increased, therefore the possibility of the first TFT being destroyed exists. Furthermore, since the gate electrode (G) of the second TFT 532 is directly connected with the external output electrode 502 of the bus line and the gate electrode (G) of the third TFT 534 is directly connected with the short ring 506, the redundancy against shortage is reduced.

As still another conventional electrostatic protection circuit, there is a structure shown in FIG. 31, which is described in the publication of Japanese Laid Open Patent Application No. 7-60875. This is an electrostatic protection circuit connecting between the bus line 504 and the short ring 506 via a resistive component by a two-way transistor using non-linear elements 402 and 404. Besides the two-way transistor, a non-linear element such as a Schottky diode, which can be a resistive component, may be also used. Since the resistive component by the non-linear element has a sufficient high resistive component so as not to affect the operation of each bus line, the resistive component by the non-linear element can remain the panel is completed. Further, as to static electricity, since some current which can disperse electric charge flows, the resistive component of the non-linear element functions as an anti-electrostatic element.

Although in the method arranging the high resistive component by the non-linear element such as the two-way transistor, the high resistive component can be formed in a relatively small area, problems occur with respect to controlling the current since the structure of the device becomes complex and moreover the resistive component is altered by an external charges (for example, static electricity) owing to the non-linear element. Further, since the high resistive component can not be formed outside the ensured area for operation of operating semiconductor film of the transistor such as the area adjacent to an end face of glass, a problem of not being able to make the size of the panel large against a mother glass exists.

Accordingly, although the short ring is required to be removed in the panel process or in the unit assembly process after the panel is completed according to the conventional liquid crystal display, a problem exists in which a measure against static electricity can not be taken in the processes after the short ring is removed.

Further, in the method arranging the zigzag pattern using the ITO, a problem exists in which if the length of the zigzag pattern is long, the external size of the panel becomes large.

Furthermore, the conventional liquid crystal display has problems in which the electrostatic protection element (circuit) for preventing a device destruction due to static electricity is poor in redundancy, the area between the bus line and the short ring is easily short-circuited or the electrostatic protection element does not function as a protection circuit against the static electricity generating relatively low voltage for a long period of time.

Also, if the non-linear element such as the two-way transistor is used as the high resistive component, the structure of the device becomes complex and the aspect of controlling the current is disadvantageous as well. Further, since the non-linear element can not be formed adjacent to the end face of the glass, a problem of not being able to make the size of the panel large against the mother glass exists.

SUMMARY OF THE INVENTION

An object of the present invention is to provide a liquid crystal display provided with an electrostatic protection circuit superior in redundancy.

Another object of the present invention is to provide a liquid crystal display provided with a sufficient protection function against static electricity generating relatively low voltage for a long period of time.

Further object of the present invention is to provide a liquid crystal display in which measures for static electricity can be taken until the last stage of the substrate assembly process.

Furthermore object of the present invention is to provide a liquid crystal display in which an electrostatic protection element section does not affect the size of a panel.

Another object of the present invention is to provide a liquid crystal display having the electrostatic protection element section which is simple in structure of the device and not disadvantageous in an aspect of controlling the current.

Above objects are achieved by an active matrix type liquid crystal display comprising a switching element formed for each of a plurality of pixels decided by a plurality of bus lines and a short ring connected to the plurality of bus lines, and an electrostatic protection element portion formed between each of the plurality of bus lines and the short ring, wherein the electrostatic protection element portion comprises a thin film transistor having a source or a drain electrode connected to the bus line and the drain or the source electrode connected to the short ring, a first resistor connecting a gate electrode of the thin film transistor to the bus line, and a second resistor connecting the gate electrode of the thin film transistor to the short ring.

In the liquid crystal display described above, the second resistor may be a common resistor connecting the gate electrodes of the plurality of thin film transistor to the short ring.

Further, the above object are achieved by an active matrix type liquid crystal display comprising a switching element formed for each of a plurality of pixels decided by a plurality of bus lines and an electrostatic protection element portion formed between the adjacent bus lines, wherein the electrostatic protection element portion comprises a thin film transistor having a source or a drain electrode connected to one of the adjacent bus lines and the drain or the source electrode connected to the other of the bus lines, a first resistor connecting a gate electrode of the thin film transistor to one of the bus lines, and a second resistor connecting the gate electrode of the thin film transistor to the other of the bus lines.

Furthermore, above objects are achieved by an active matrix type liquid crystal display comprising a switching element formed for each of a plurality of pixels decided by a plurality of bus lines, a short ring connected to the plurality of bus lines, and a electrostatic protection element portion formed between each of the plurality of bus lines and the short ring, wherein the electrostatic protection element portion comprises a first thin film transistor having a source or a drain electrode connected to the bus line and the drain or the source electrode connected to the short ring, a conductive material connected to a gate electrode of the first thin film transistor, a second thin film transistor having a source or a drain electrode connected to the bus line, the drain or a source electrode connected to the conductive material, and a gate electrode electrically floated, and a third thin film transistor having a source or a drain electrode connected to the short ring, the drain or the source electrode connected to the conductive material, and a gate electrode electrically floated.

In the liquid crystal display described above, the third thin film transistor may be a common transistor connecting the gate electrodes of the plurality of first thin film transistors to the short ring.

Further, above objects are achieved by an active matrix type liquid crystal display comprising a switching element formed for each of a plurality of pixels decided by a plurality of bus lines, and an electrostatic protection element portion formed between the adjacent bus lines, wherein the electrostatic protection element portion comprises a first thin film transistor having a source or a drain electrodes connected to one of the adjacent bus lines and the drain or the source electrode connected to the other of the bus lines, a conductive material connected to a gate electrode of the first thin film transistor, a second thin film transistor having a source or a drain electrode connected to one of the bus lines, the drain or the source electrode connected to the conductive material, and a gate electrode electrically floated, and a third thin film transistor having a source or a drain electrode connected to the other of the bus lines, the drain or the source electrode connected to the conductive material, and a gate electrode electrically floated.

In the liquid crystal display of the present invention above, the gate electrode of the first transistor can be connected to the conductive material via capacitor. Also, a channel length of at least one of the second and the third thin film transistors can be shorter than a channel length of the first thin film transistor.

In the conventional electrostatic protection circuit short-circuiting the gate electrodes (G) of the second and the third TFT's 532 and 534 with the bus line 502 and the short ring 506 respectively as shown in FIG. 30, the current does not flow in the second and the third TFT's 532 and 534 in reality and the electrostatic protection circuit is used only for controlling the gate potential of the first TFT 530. On the other hand, the first and the second resistors or the second and the third TFT's of the present invention show a two-way conductivity between the bus line and the short ring, thereby enabling the current to flow. Thus, the first and the second resistors or the second and the third TFT's have a function of preliminarily releasing the charge due to static electricity before the first TFT for primarily running the current sufficiently conducts. In other words, since the current preliminarily flows in the second and the third TFT's, the load on the first TFT can be reduced and the redundancy of the electrostatic protection circuit can be improved.

Further, the gate electrode of the first TFT of the present invention is connected with the bus line and the short ring via capacitors and the potential of the gate electrode gently varies for a time required to charge and discharge these capacitors. Therefore, according to the structure of the present invention, gentle static electricity can sufficiently be dealt with. When the capacitor is inserted between the gate electrode of the first TFT and a common conductor between the second and the third TFT, a reaction becomes gentle as a whole further and the efficiency as the electrostatic protection element is improved.

Furthermore, the structure shown in FIG. 30 has more number of elements than the structure shown in FIGS. 29*a* and 29*b* and the redundancy is improved. However, for example, if the gate electrode (G) and the drain electrode (D) of the second TFT 532 are short-circuited and at the same time the gate electrode (G) and the drain electrode (D) of the first TFT 530 are short-circuited, the function as the electrostatic protection circuit is lost. Similarly, when the gate electrode (G) and the drain electrode (D) of the third TFT 534 are short-circuited and at the same time the gate electrode (G) and the drain electrode (D) of the first TFT 530 are short-circuited, or when the gate electrode (G) and the drain electrode (D) of the second TFT 532 are short-circuited and at the same time the gate electrode (G) and the drain electrode (D) of the third TFT 530 are short-circuited, the function as the electrostatic protection circuit is also lost. In other words, according to the circuit shown in FIG. 30, if the elements in the circuit are short-circuited at two places as described above, a defect occurs.

On the contrary, for example, describing this embodiment with reference to FIG. 3, in the structure according to the present invention, if the gate electrode (G) and the source electrode (S) of the second TFT 38 are short-circuited and the gate electrode (G) and the drain electrode (D) of the second TFT 38 are also short-circuited and at the same time the gate electrode (G) and the drain electrode (D) of the first TFT 32 are short-circuited, the function as the electrostatic protection circuit is lost. Similarly, when the gate electrode (G) and the source electrode (S) of the third TFT 40 are short-circuited, and the gate electrode (G) and the drain electrode (D) of the third TFT 40 are also short-circuited and at the same time the gate electrode (G) and the drain electrode (D) of the first TFT 32 are short-circuited, or when the gate electrode (G) and the source electrode (S) of the second TFT 38 are short-circuited, the gate electrode (G) and the drain electrode (D) of the second TFT 38 are also short-circuited, the gate electrode (G) and the drain electrode (D) of the second TFT 38 are also short-circuited, the gate electrode (G) and the source electrode (S) of the third TFT 40 are also short-circuited, and at the same time the gate electrode (G) and the drain electrode (D) of the third TFT 40 are short-circuited, the function as the electrostatic protection circuit is lost. In other words, according to the specific circuit of the present invention shown in FIG. 3, when the elements in the circuit short-circuit at more than three places, then the function stops for the first time as the electrostatic protection circuit. Thus, since the gate in the electrostatic protection circuit according to the present invention is in a floating state, the redundancy for a shortage of the structuring elements is also superior.

Further, above objects are achieved by an active matrix type liquid crystal display comprising a switching element formed for each of a plurality of pixels decided by a plurality of bus lines, a short ring connected to the plurality of bus lines, and an electrostatic protection element portion formed between each of the plurality of bus lines and the short ring, wherein the electrostatic protection element portion comprises a plurality of metal layers, an insulating layer formed on the plurality of metal layers, a contact hole formed by opening the insulating layer on the plurality of metal layers, and a connecting layer electrically connecting between the metal layers via the contact hole.

Furthermore, above objects are achieved by an active matrix type liquid crystal display comprising, a switching element formed for each of a plurality of pixels decided by a plurality of bus lines, and an electrostatic protection element portion formed between the adjacent bus lines, wherein the electrostatic protection element portion comprises a plurality of metal layers, an insulating layer formed on the plurality of metal layers, a contact hole formed by opening the insulating layer on the plurality of metal layers, and a connecting layer electrically connecting between the metal layers via the contact hole.

According to the present invention, the contact holes are formed on the protection film on the gate bus line or the data (drain) bus line and the short ring and each of the bus lines are electrically connected via the contact holes. A contact resistance generated between different metals (for example, Ti and ITO) in this structure can obtain the ohmic contact by selecting materials and the resistance value of the resistive component can also be controlled by the number or the size of the contact holes, or by the subsequent treatment processes for the underlying metal. The metal contact is certainly not limited to the ohmic contact and a resistive device having a non-linear characteristic can be arranged by the Schottky connection.

Since the anti-electrostatic element formed according to the present invention is easy to control the resistance (current control) and the structure is simple as well, a stable resistive component can be held. Further, since an arbitrary resistive component can be formed by the method previously described, the array inspection can be possible and a sufficient protective function against static electricity can also be held by constructing the resistive component.

BRIEF DESCRIPTION OF THE DIAGRAMS

FIG. 1 is a diagram showing a schematic structure of a liquid crystal display according to a first embodiment of the present invention.

FIGS. 2*a* and 2*b* are diagrams showing a circuit structure and an operation of an electrostatic protection element section according to the first embodiment of the present invention.

FIG. 3 is a diagram showing a circuit structure of an electrostatic protection element which is a characteristic component of a liquid crystal display according to a second embodiment of the present invention.

FIGS. 4*a*, 4*b* and 4*c* are diagrams showing a structure of the electrostatic protection circuit according to the second embodiment of the present invention.

Figure 8A:
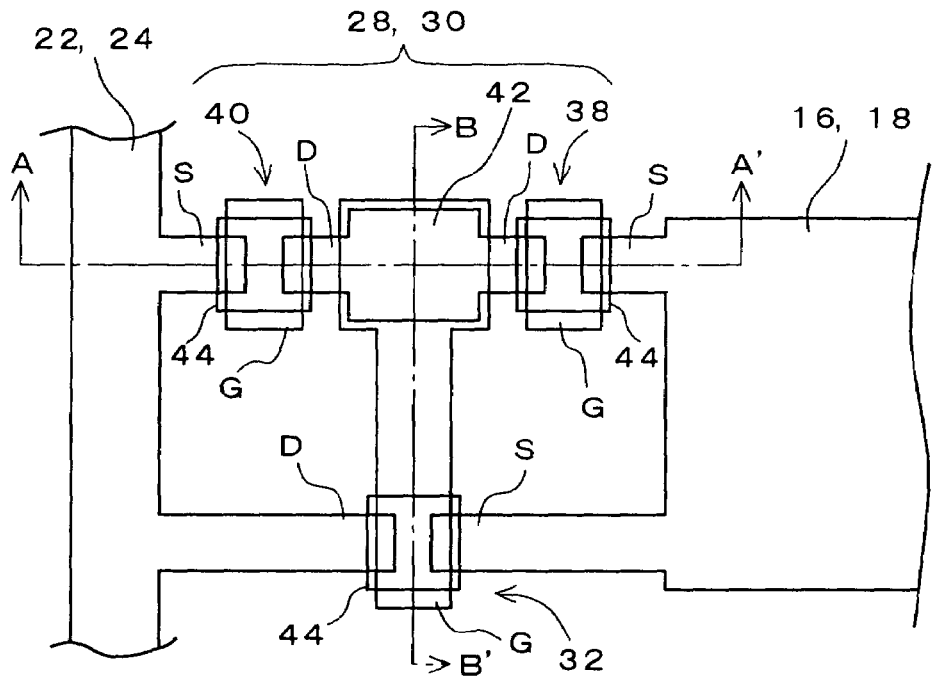
Figure 8B:
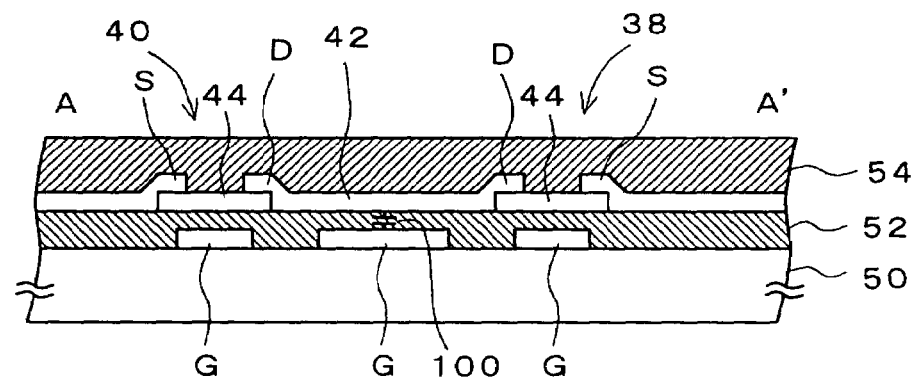
Figure 8C:
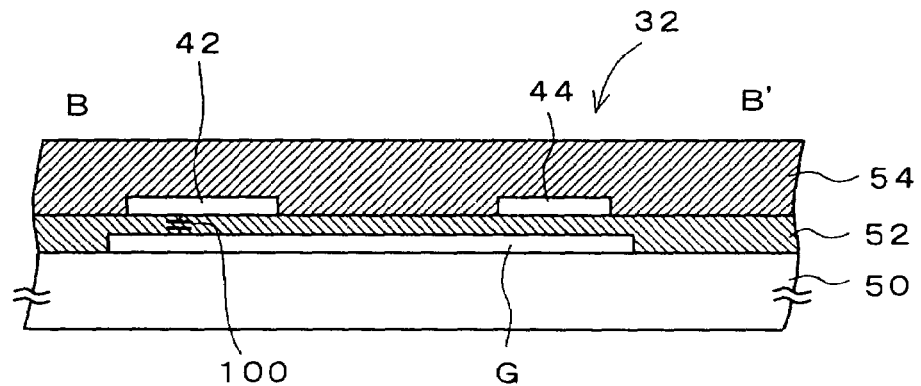

FIGS. 8*a*, 8*b* and 8*c* are diagrams showing a structure of the electrostatic protection circuit according to the fourth embodiment of the present invention.

Figure 9:
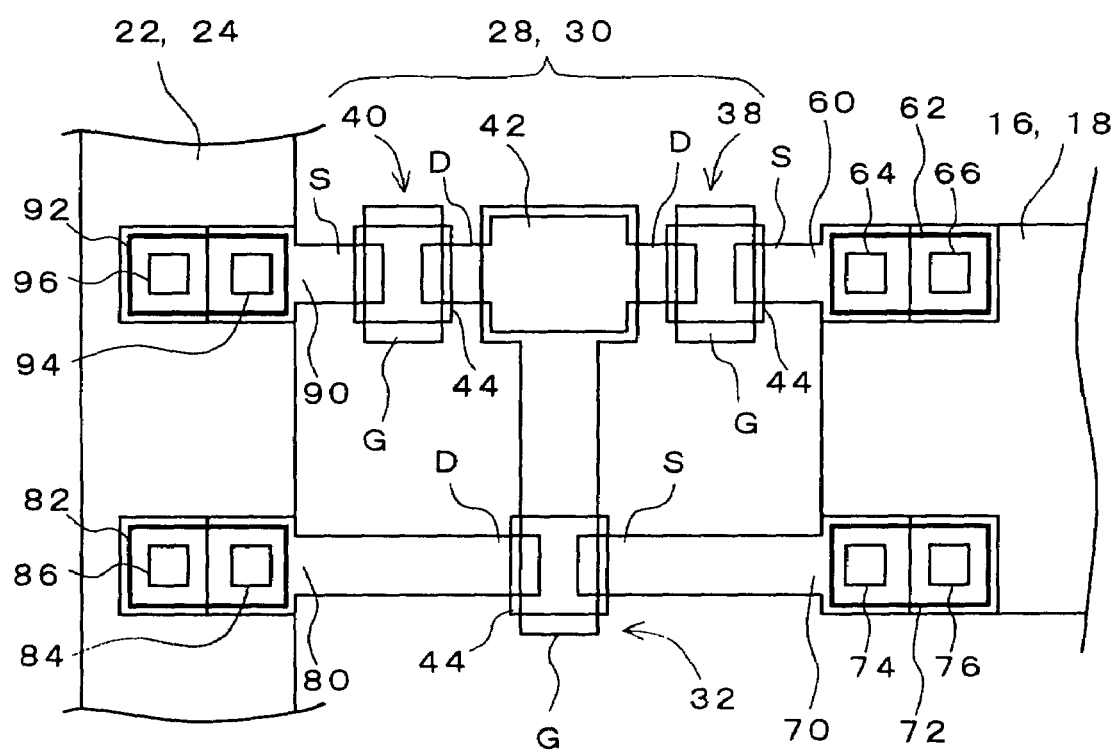

FIG. 9 is a diagram showing an example of a variation of the structure of the electrostatic protection circuit according to the fourth embodiment of the present invention.

Figure 10:
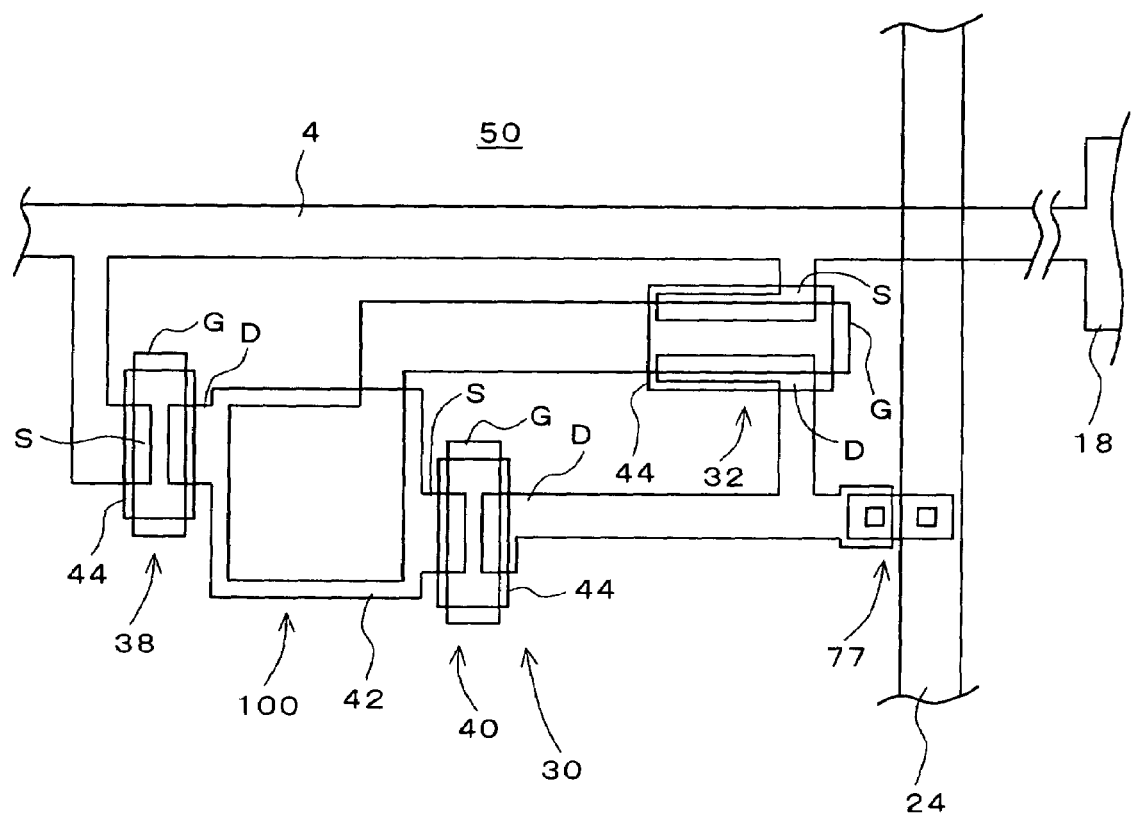

FIG. 10 is a diagram showing an example of a variation of the electrostatic protection circuit according to the fourth embodiment of the present invention.

Figure 11:
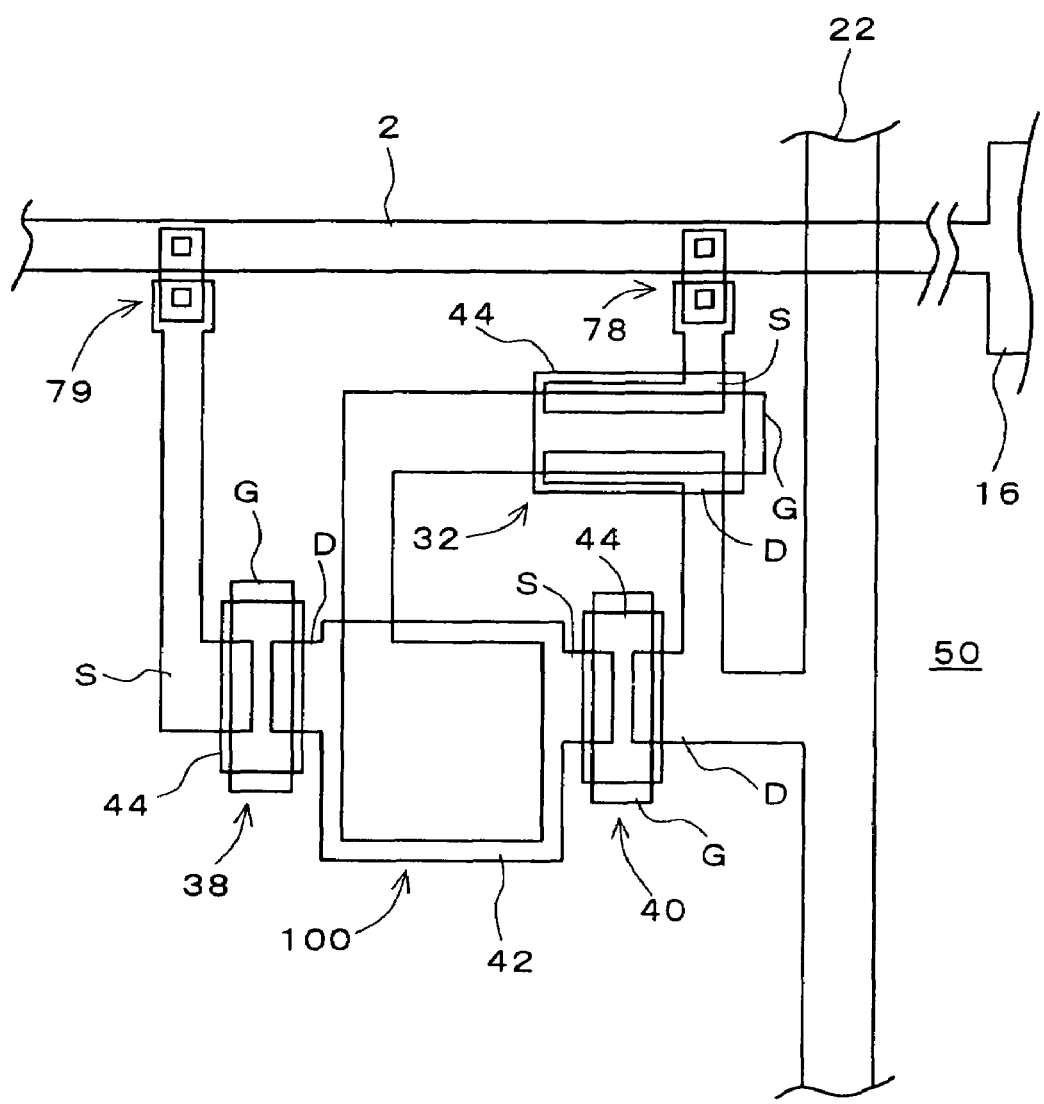

FIG. 11 is a diagram showing an other example of the variation of the electrostatic protection circuit according to the fourth embodiment of the present invention.

Figure 12:
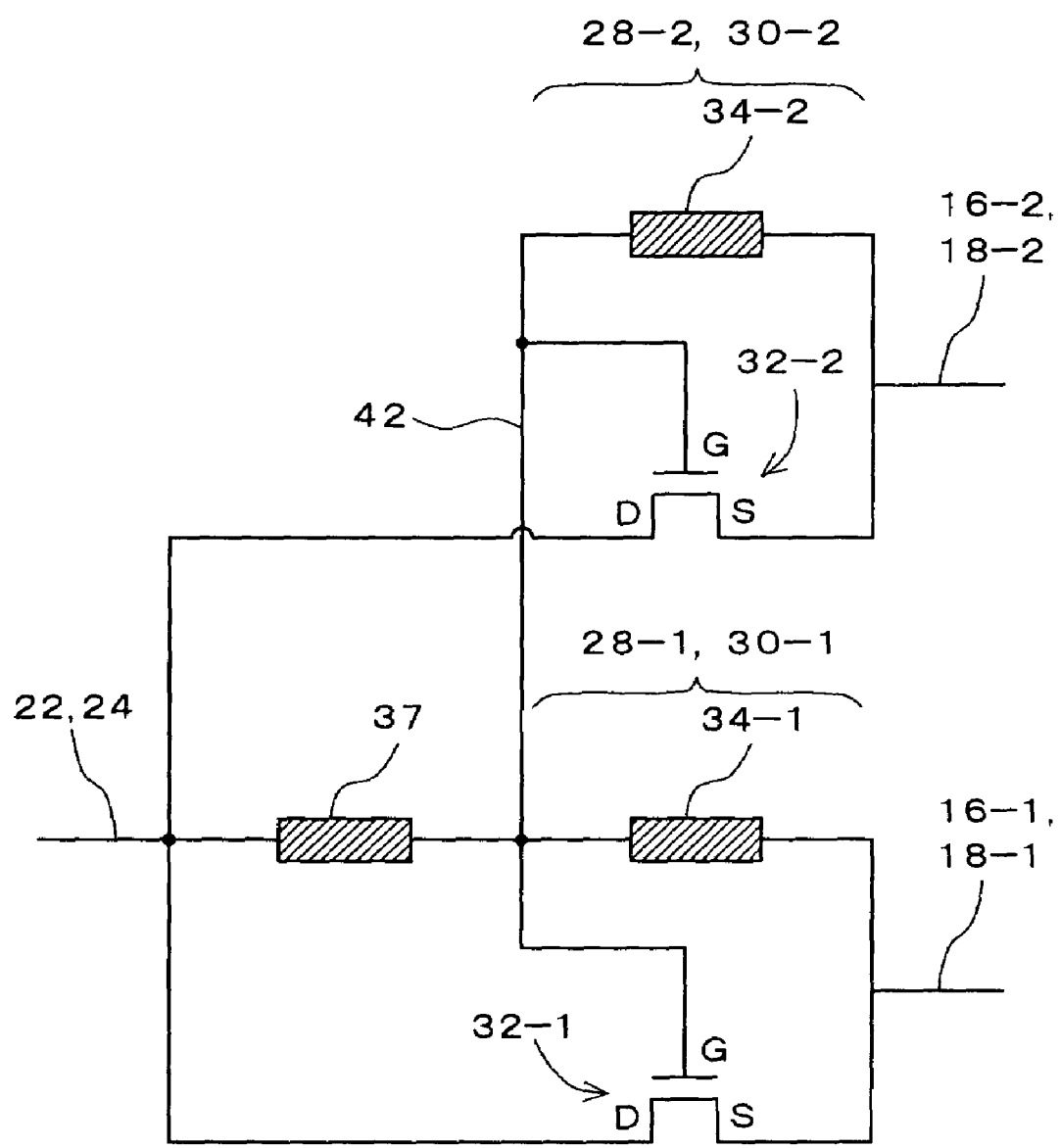

FIG. 12 is a diagram showing a circuit of an electrostatic protection element section of a liquid crystal display according to a fifth embodiment of the present invention.

Figure 13:
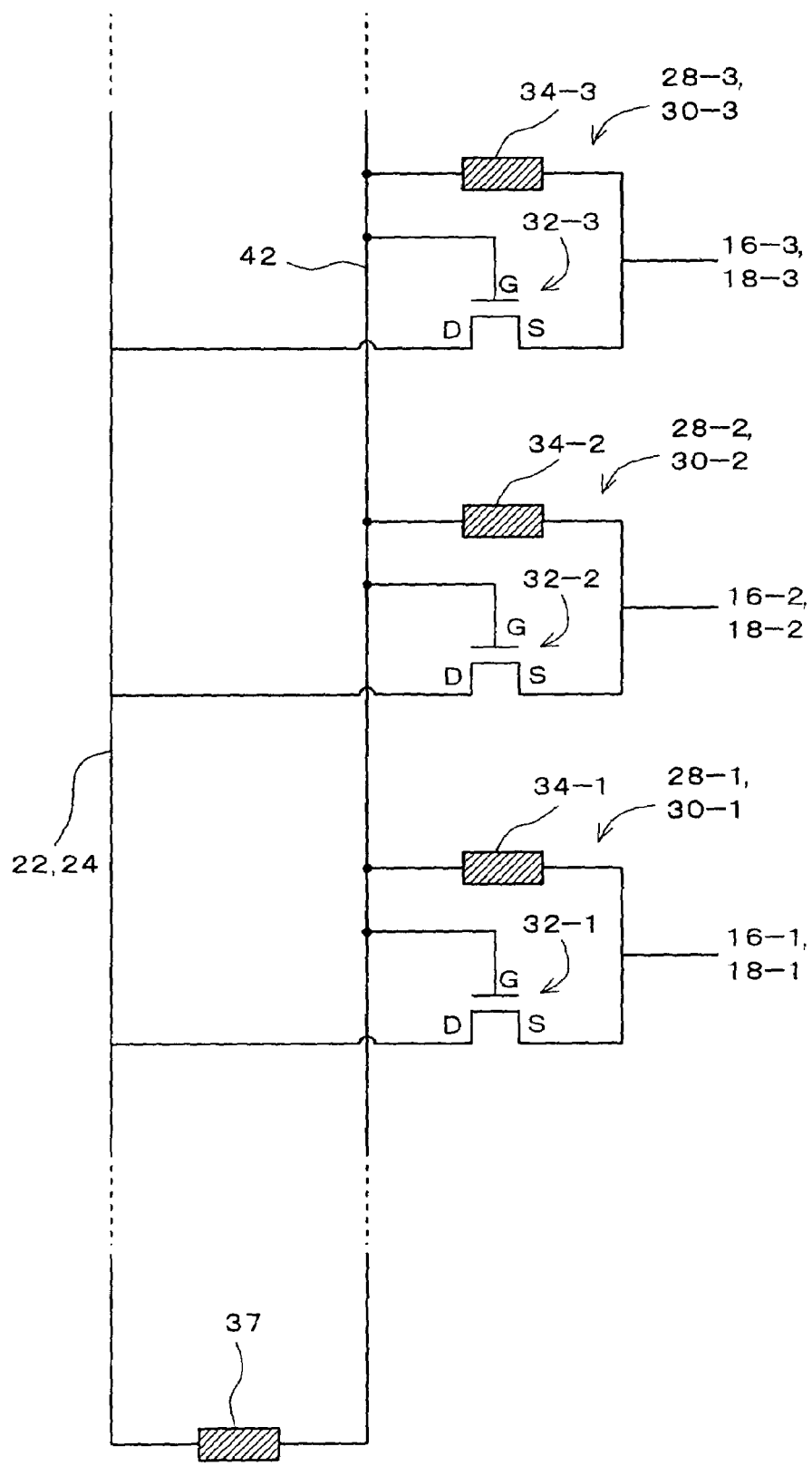

FIG. 13 is a diagram showing an example of a variation of the electrostatic protection circuit of the liquid crystal display according to the fifth embodiment of the present invention.

Figure 14:
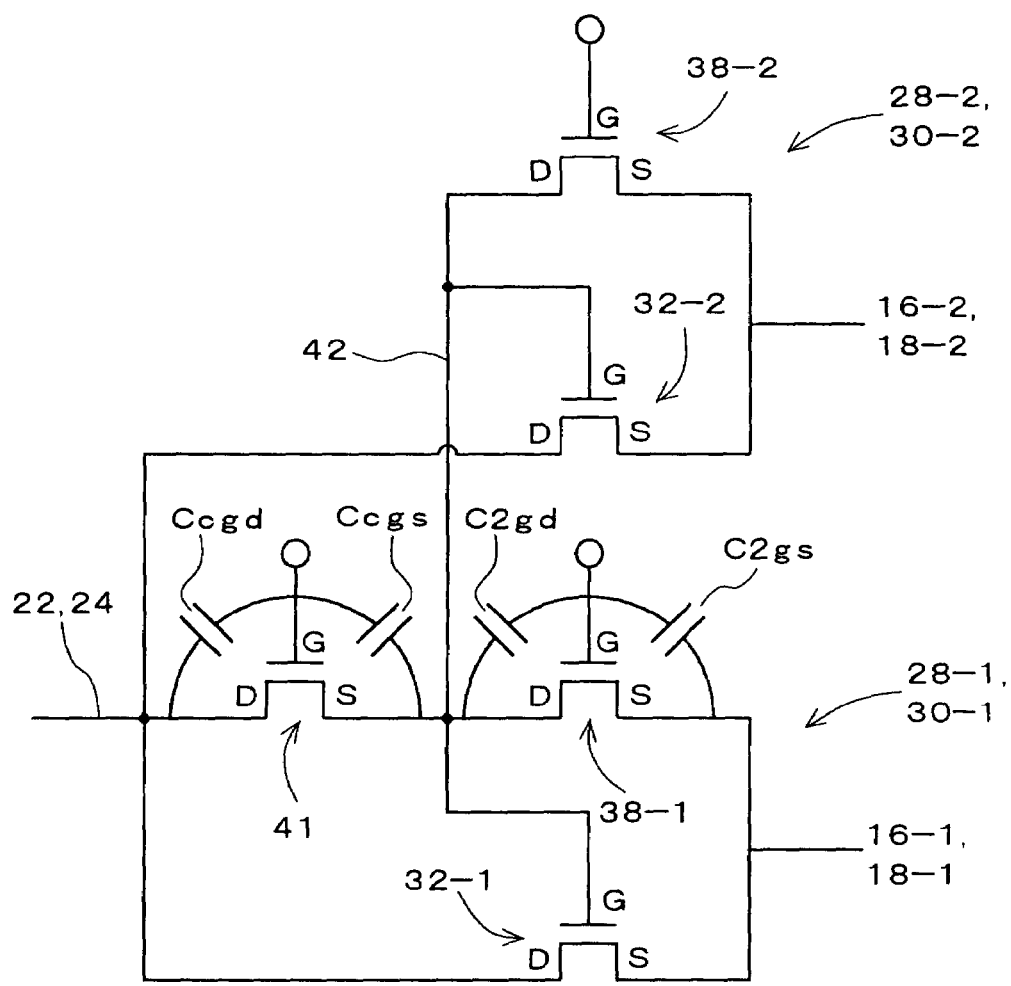

FIG. 14 is a diagram showing a circuit of an electrostatic protection element section of a liquid crystal display according to a sixth embodiment of the present invention.

Figure 15:
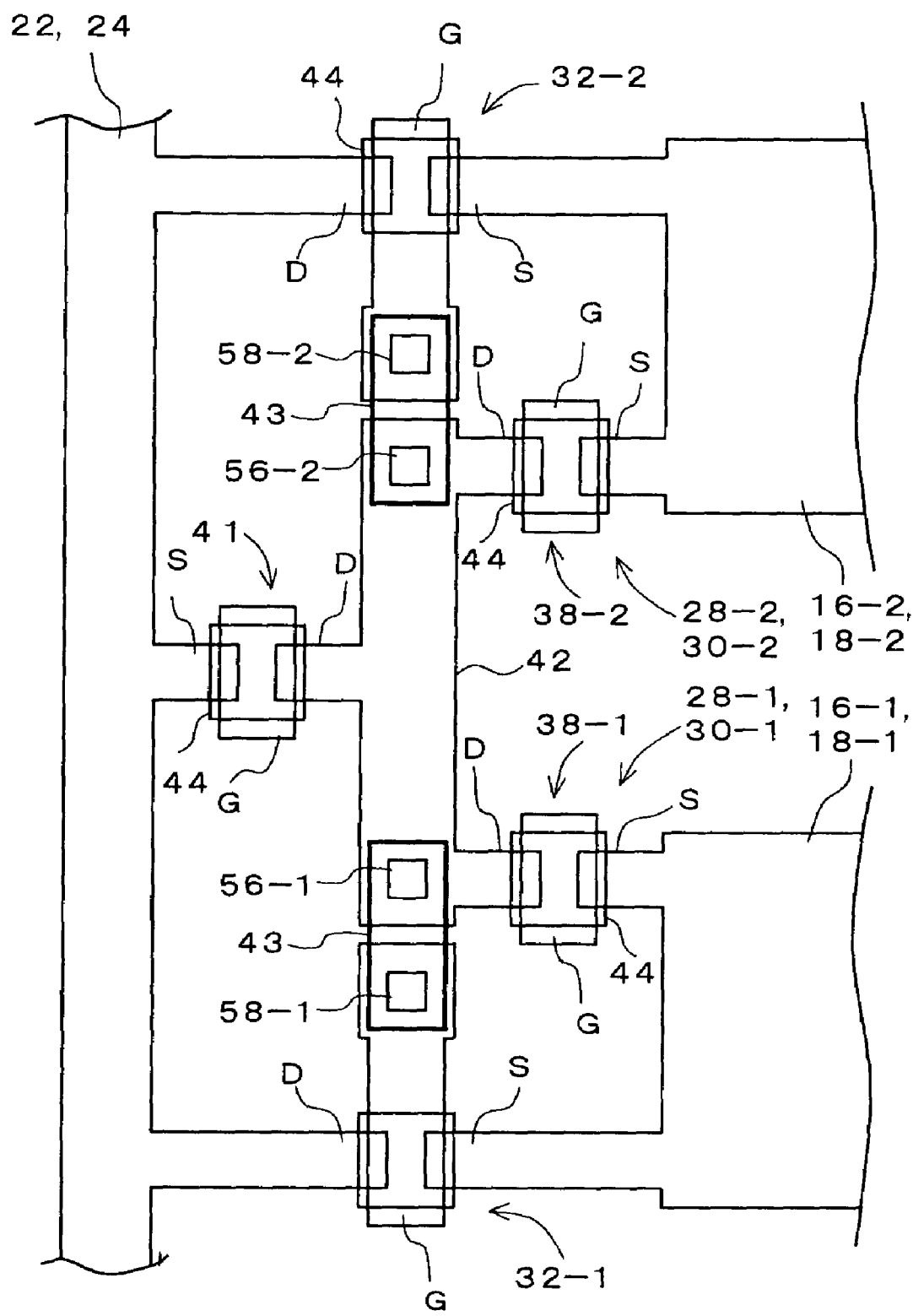

FIG. 15 is a diagram showing a structure of the electrostatic protection circuit of the liquid crystal display according to the sixth embodiment of the present invention.

Figure 16:
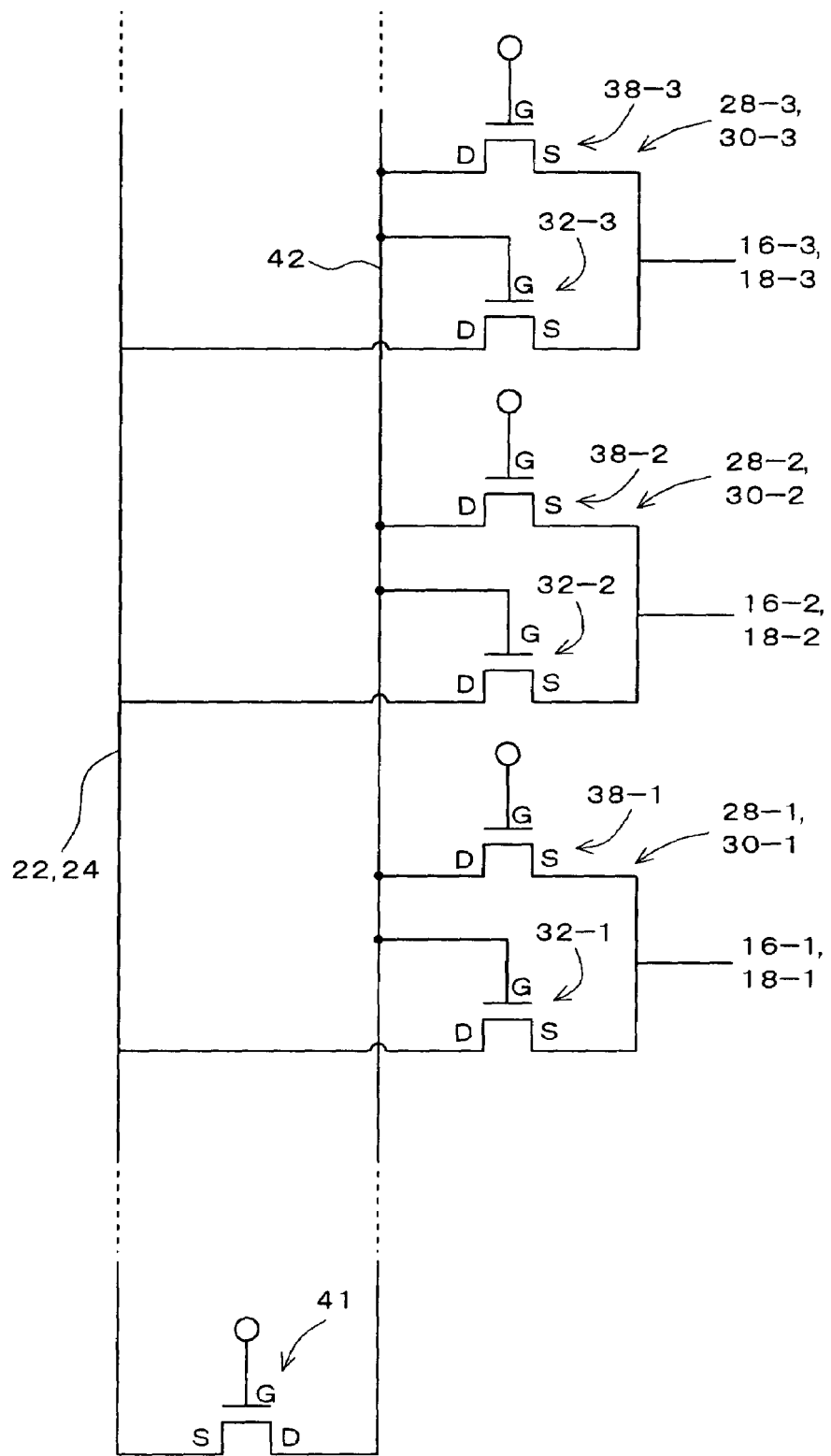

FIG. 16 is a diagram showing an example of a variation of the electrostatic protection circuit of the liquid crystal display according to the sixth embodiment of the present invention.

Figure 17:
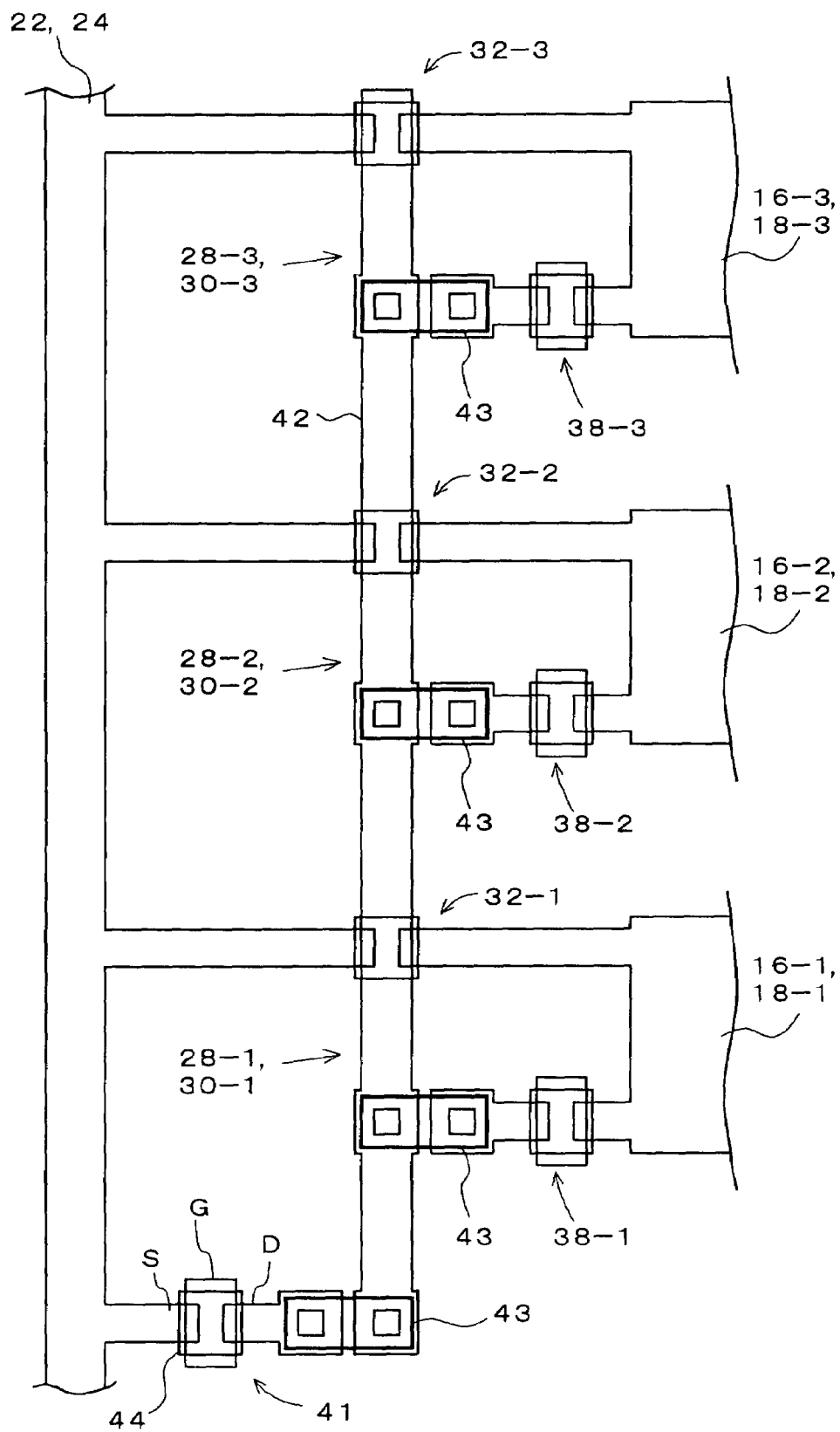

FIG. 17 is a diagram showing a structure of an example of a variation of the electrostatic protection circuit of the liquid crystal display according to the sixth embodiment of the present invention.

Figure 18:
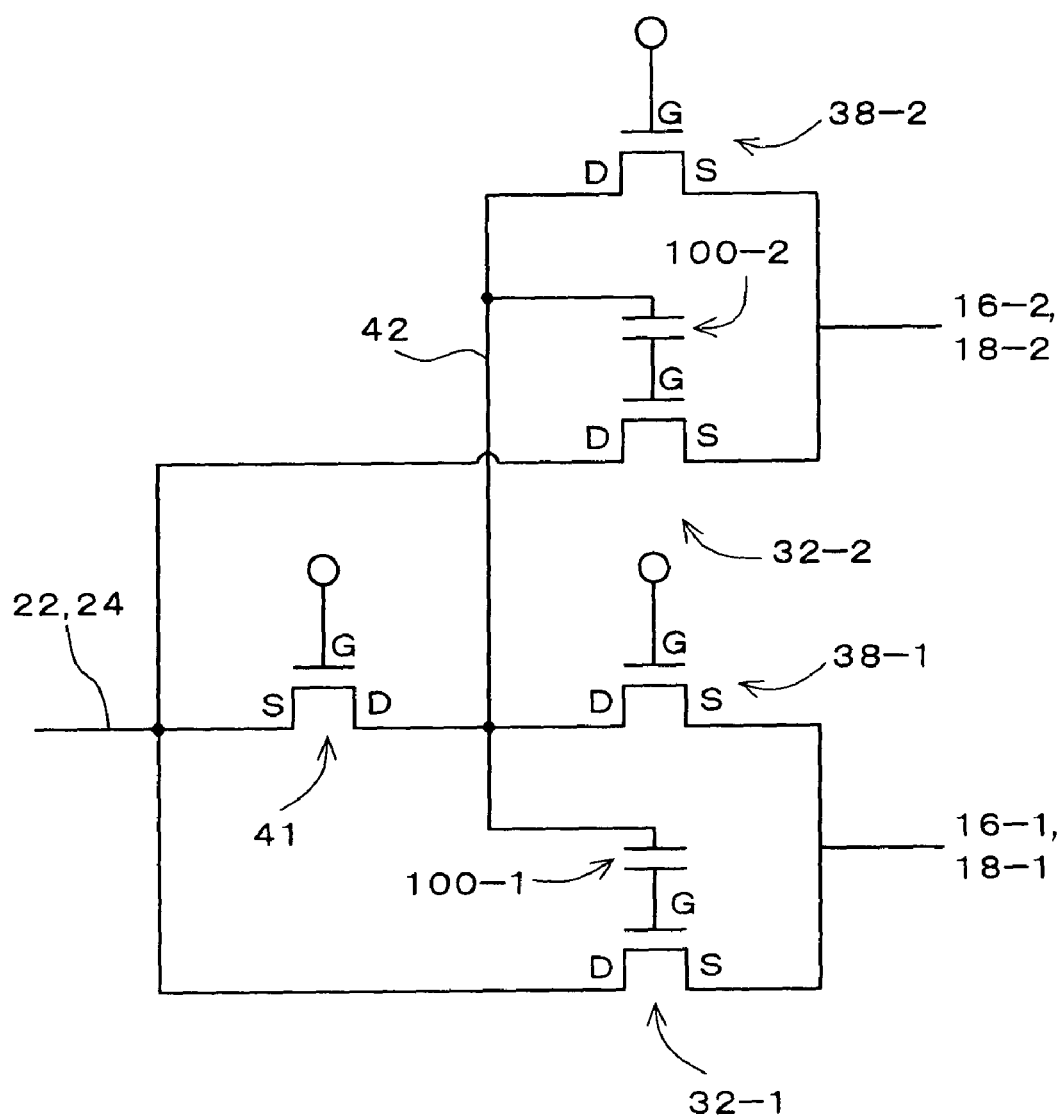

FIG. 18 is a diagram showing a circuit of an electrostatic protection element section of a liquid crystal display according to a seventh embodiment of the present invention.

Figure 19:
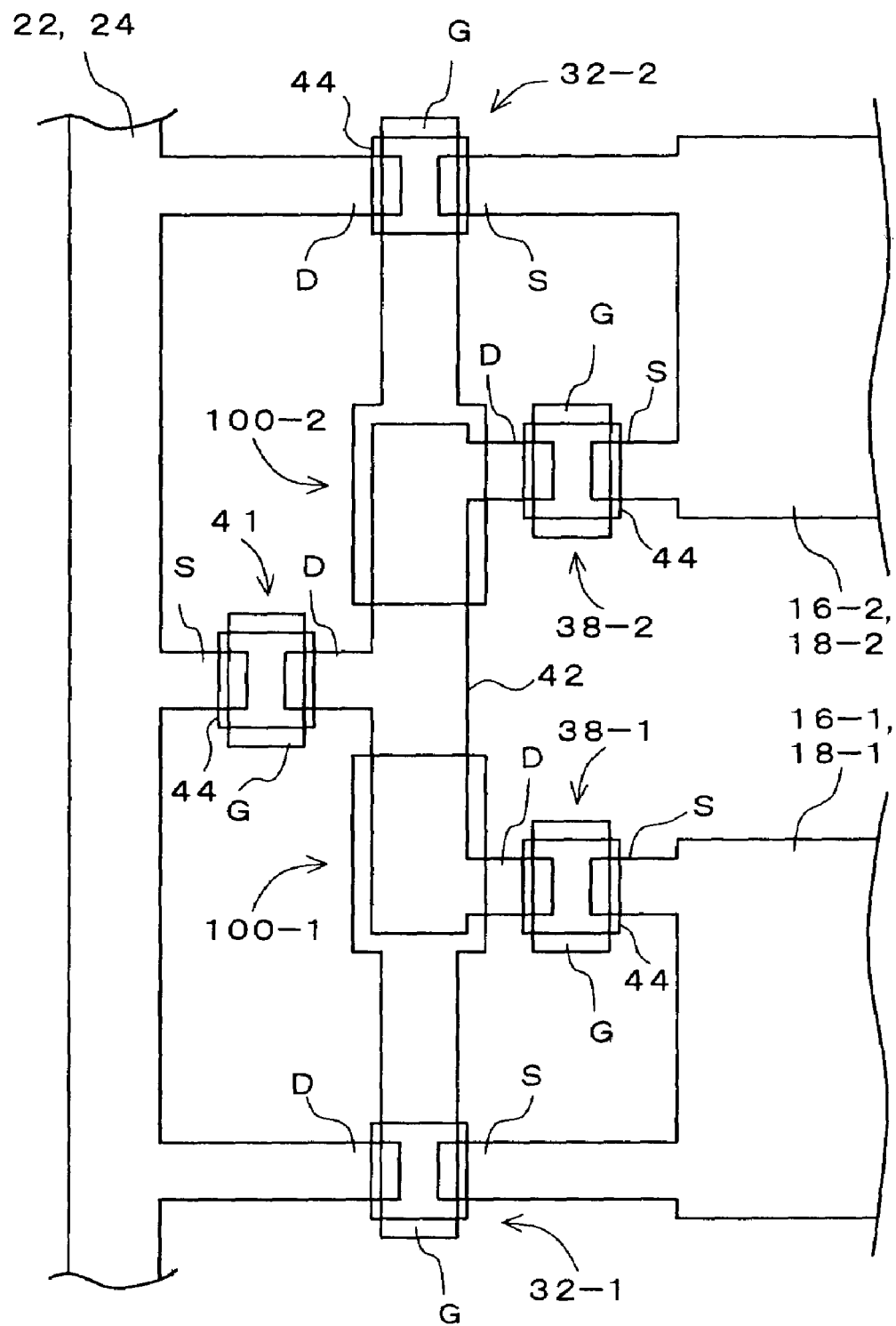

FIG. 19 is a diagram showing a structure of the electrostatic protection circuit of the liquid crystal display according to the seventh embodiment of the present invention.

Figure 20:
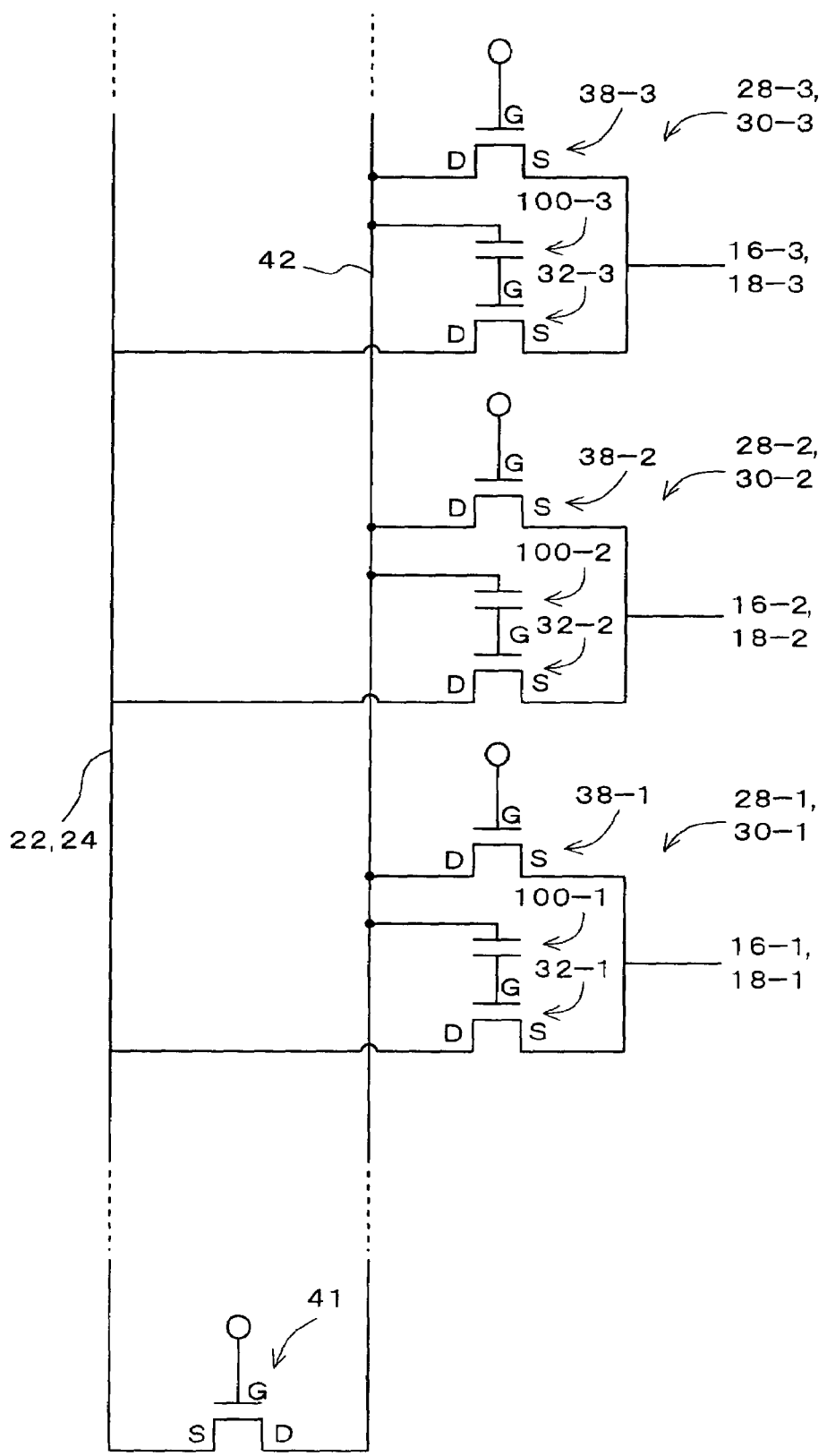

FIG. 20 is a diagram showing an example of a variation of the electrostatic protection circuit of the liquid crystal display according to the seventh embodiment of the present invention.

Figure 21:
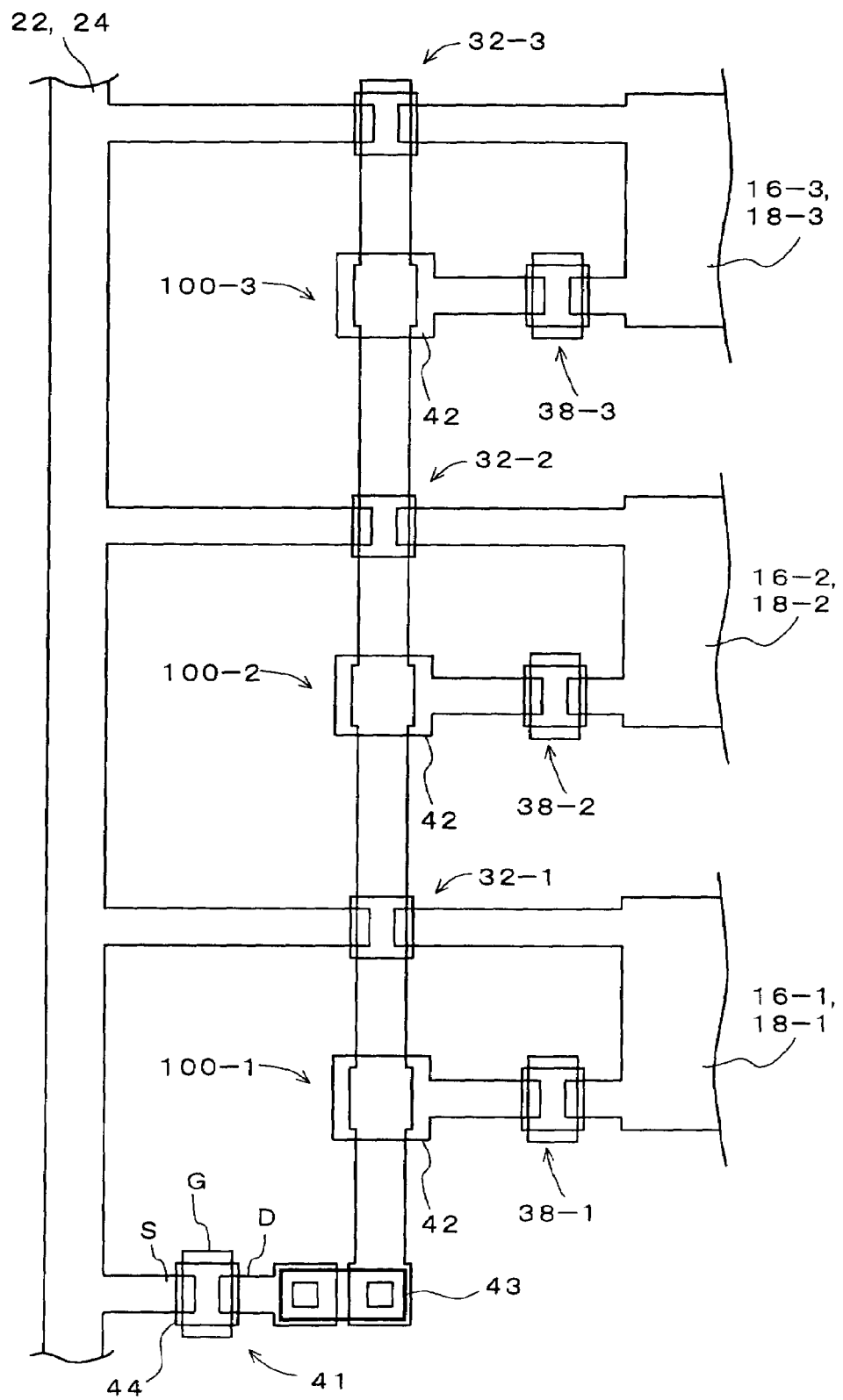

FIG. 21 is a diagram showing a structure of an example of a variation of the electrostatic protection circuit of the liquid crystal display according to the seventh embodiment of the present invention.

Figure 22:
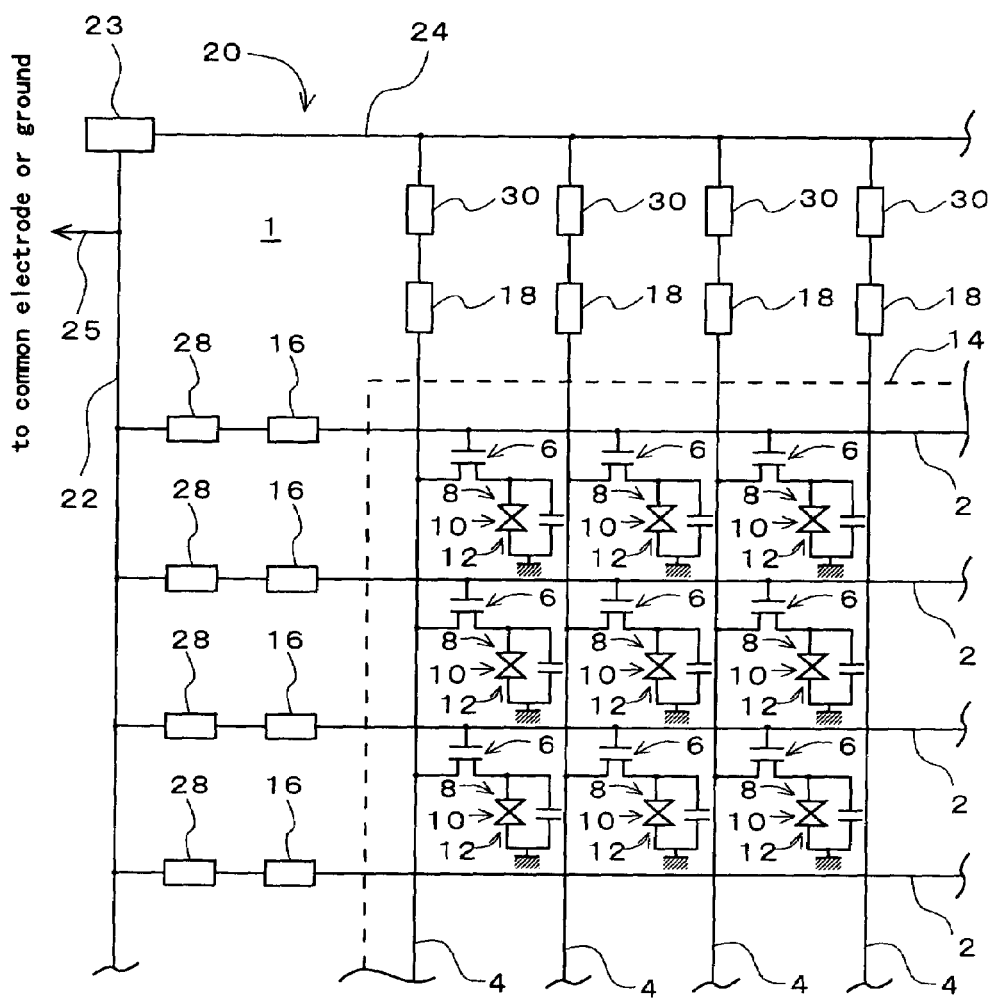

FIG. 22 is a diagram showing a structure of an example of a variation of the electrostatic protection circuit of the liquid crystal display according to the first through the seventh embodiments of the present invention.

Figure 23A:
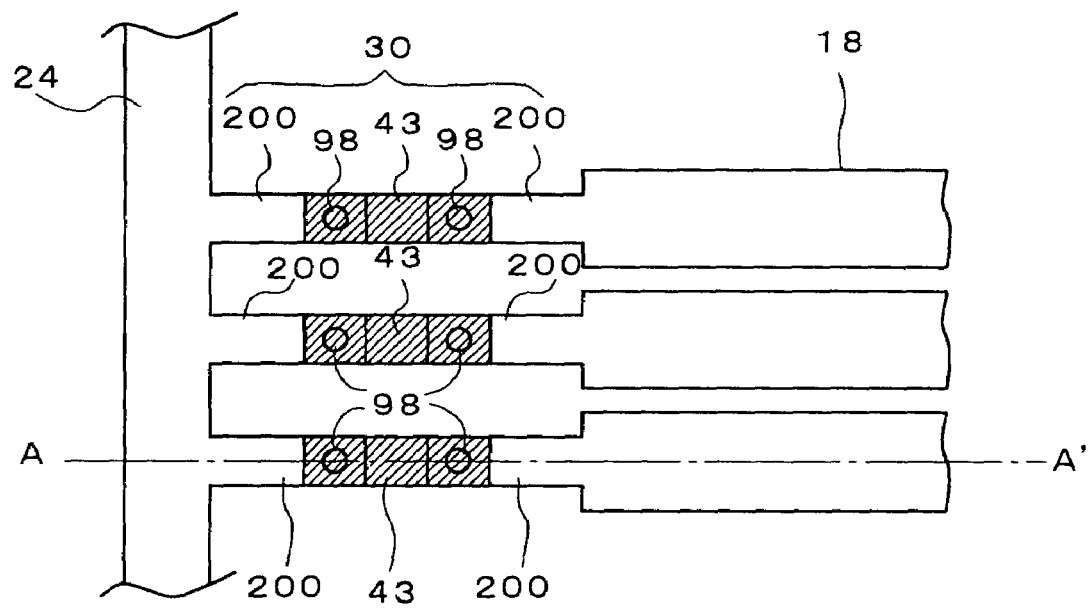
Figure 23B:
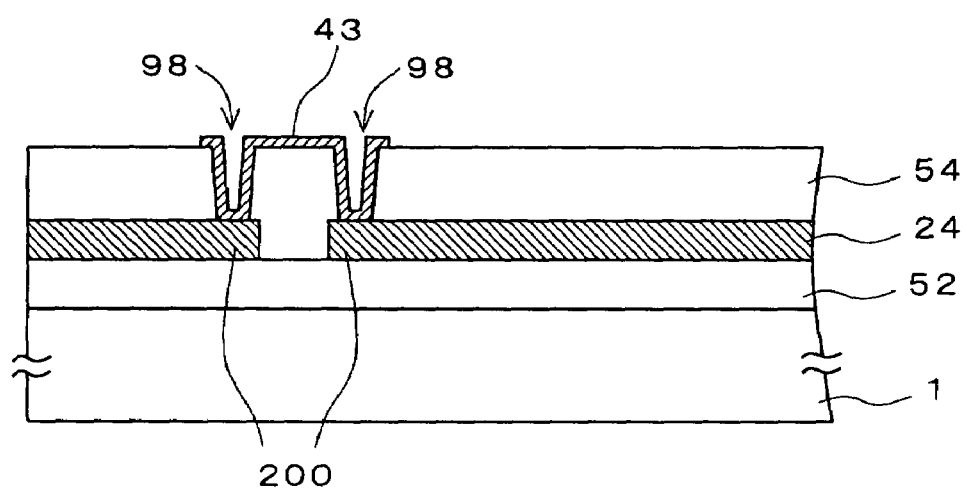

FIGS. 23a and 23b are diagrams showing a structure of an electrostatic protection circuit of a liquid crystal display according to an eighth embodiment of the present invention.

Figure 24A:
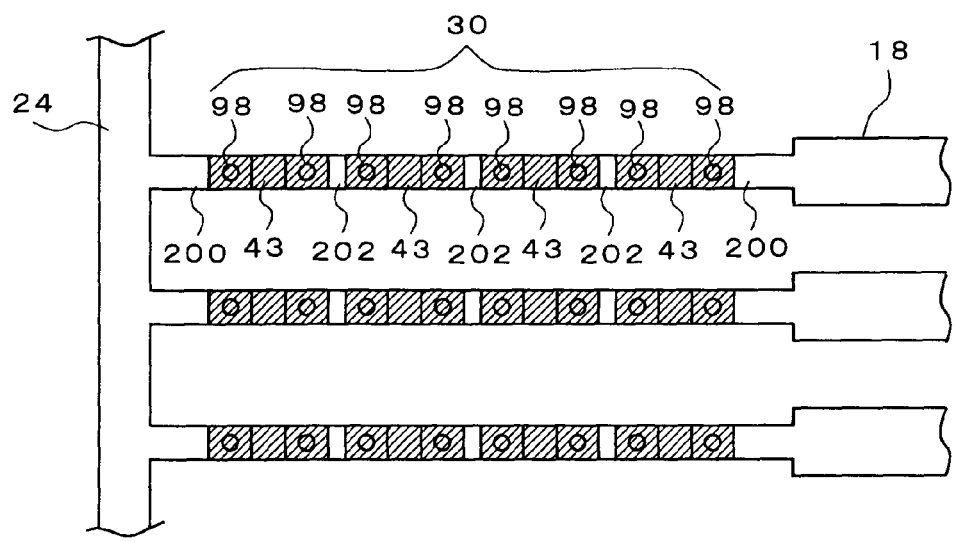
Figure 24B:
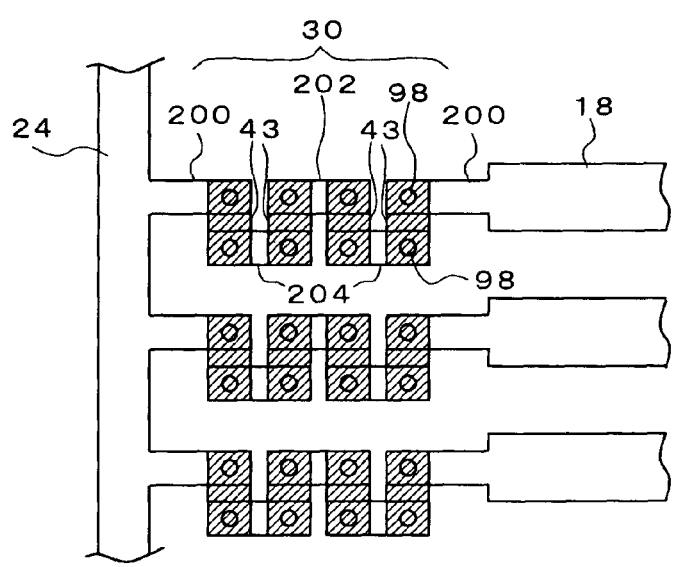

FIGS. 24a and 24b are diagrams showing a structure of an example of a variation of the electrostatic protection circuit of the liquid crystal display according to the eighth embodiment of the present invention.

FIG. 25 is a diagram showing a fabrication process of the electrostatic protection circuit of the liquid crystal display according to the eighth embodiment of the present invention.

Figure 26:
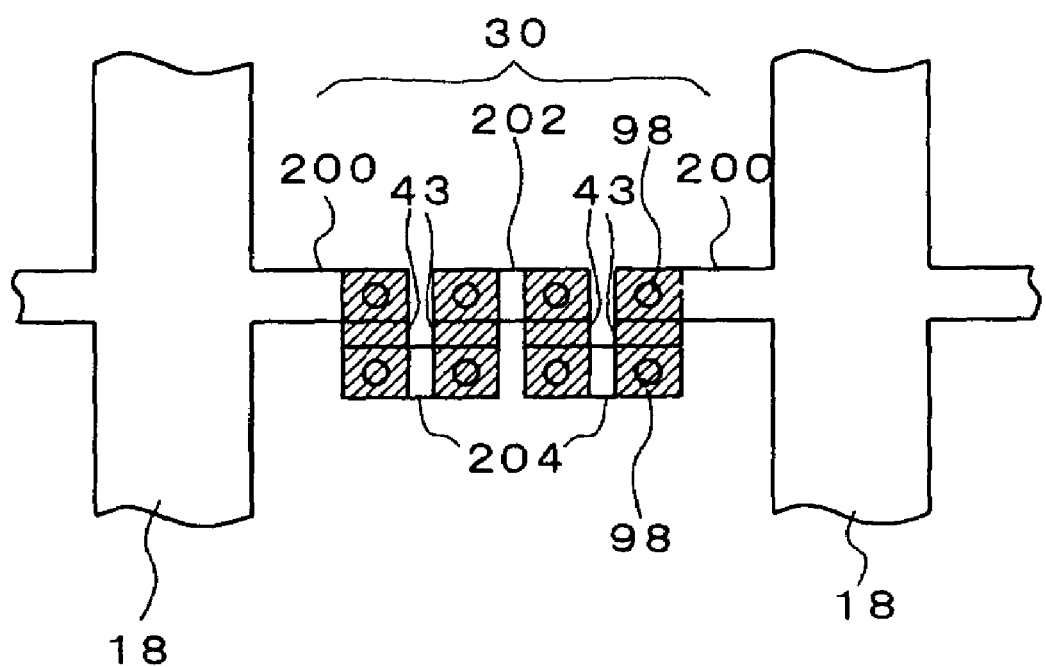

FIG. 26 is a diagram showing a structure of other example of the variation of the electrostatic protection circuit of the liquid crystal display according to the eighth embodiment of the present invention.

Figure 27:
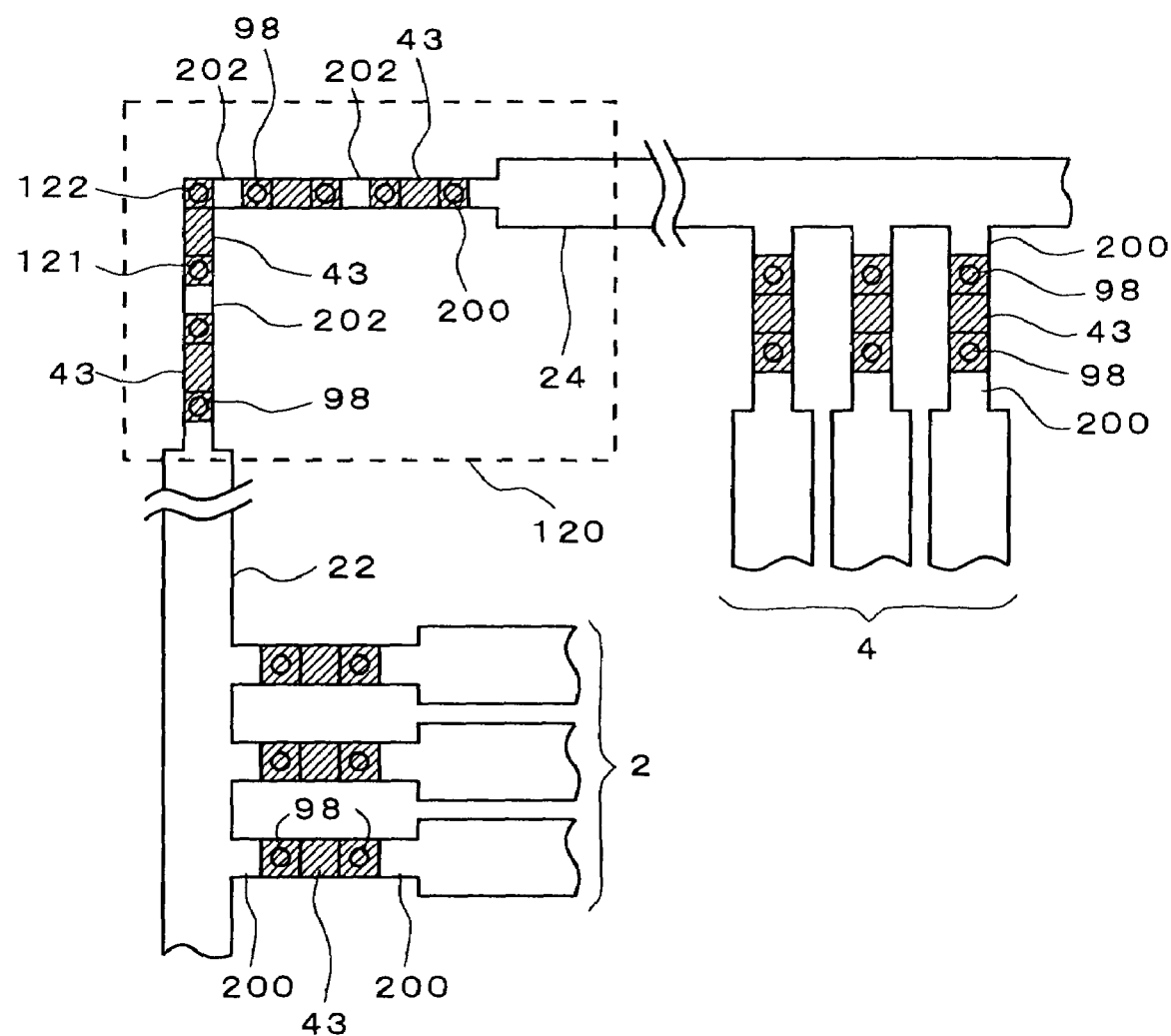

FIG. 27 is a diagram showing a structure of an example of an application of the electrostatic protection circuit of the liquid crystal display according to the eighth embodiment of the present invention.

Figure 28:
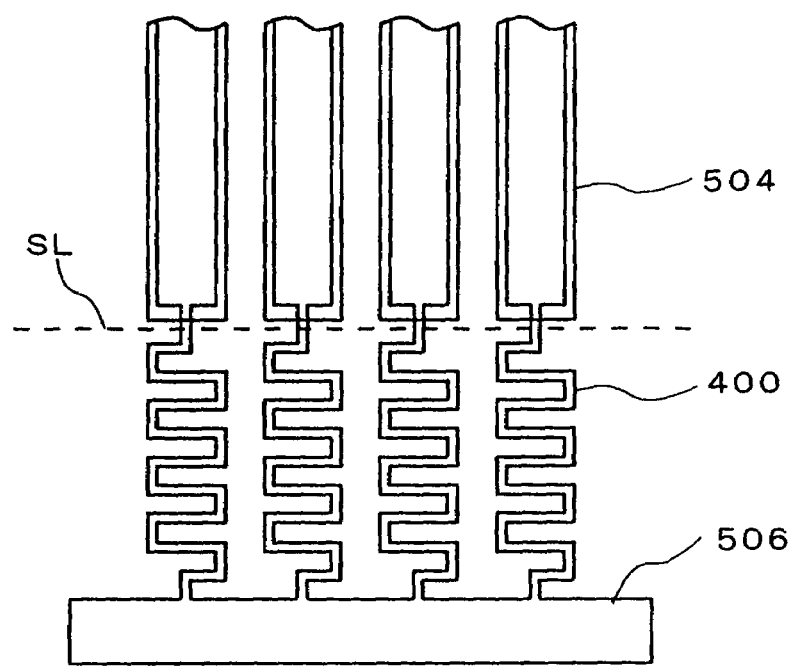

FIG. 28 is a diagram showing a structure of the electrostatic protection circuit of a conventional liquid crystal display.

Figure 29A:
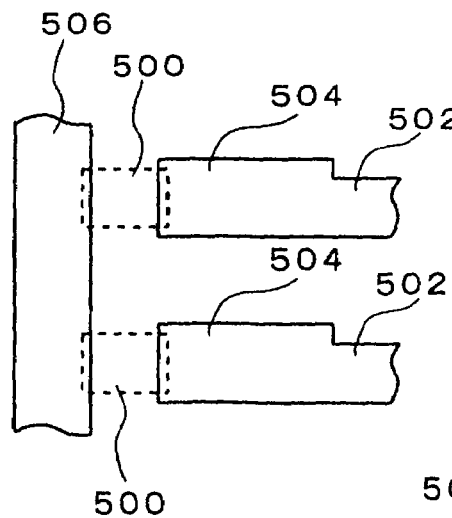
Figure 29B:
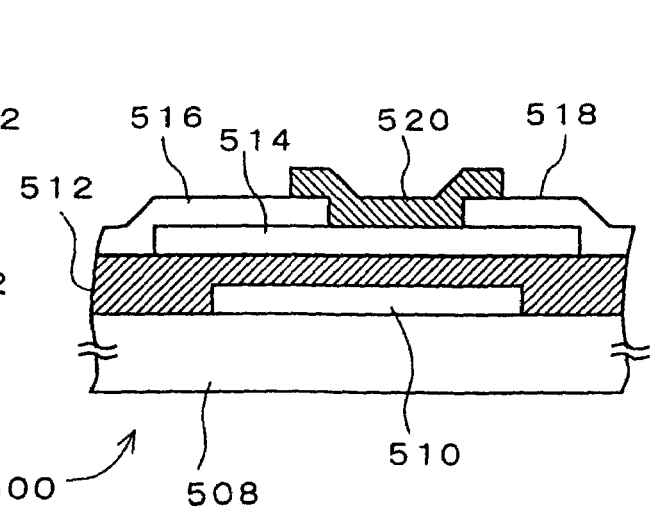

FIGS. 29a and 29b are diagrams showing a structure of the electrostatic protection circuit of the conventional liquid crystal display.

Figure 30:
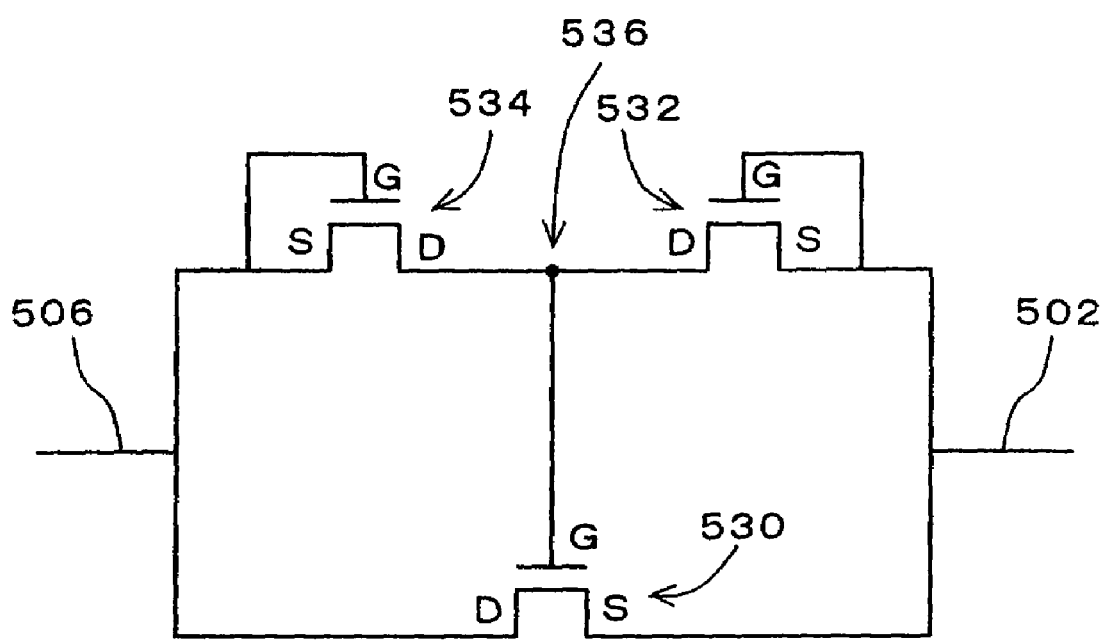

FIG. 30 is a diagram showing a structure of the electrostatic protection circuit of the conventional liquid crystal display.

Figure 31:
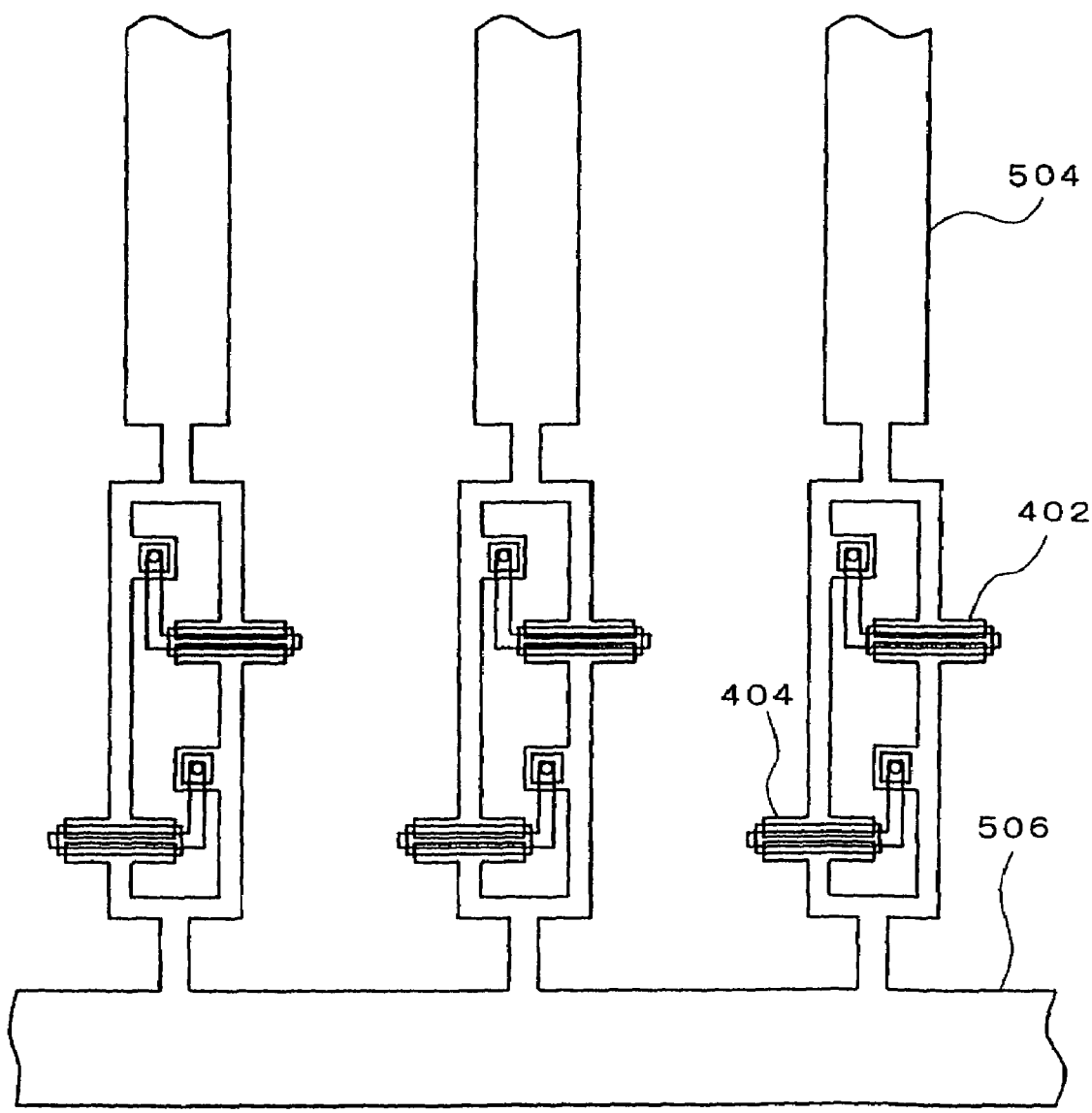

FIG. 31 is a diagram showing a structure of the electrostatic protection circuit of the conventional liquid crystal display.

DESCRIPTION OF THE PREFERRED EMBODIMENTS

Figure 1:
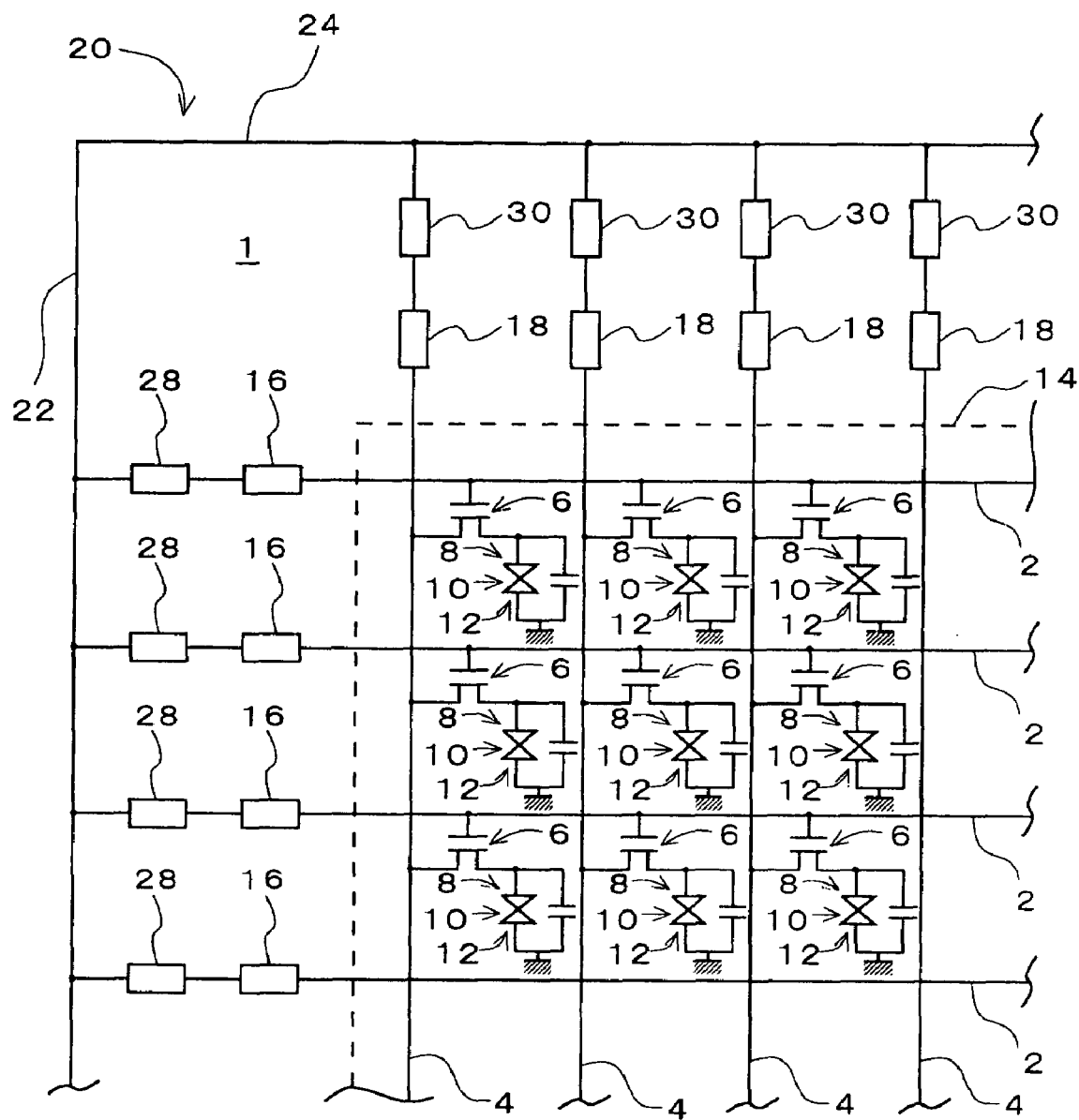
Figure 2A:
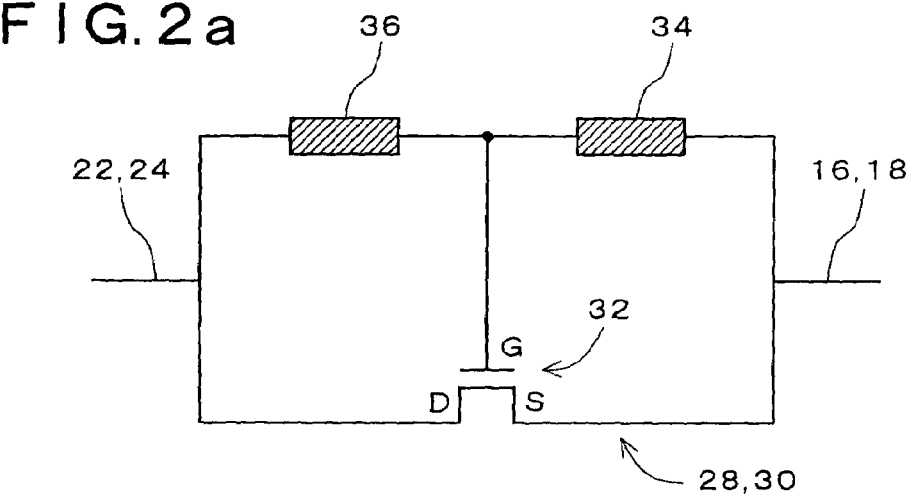
Figure 2B:
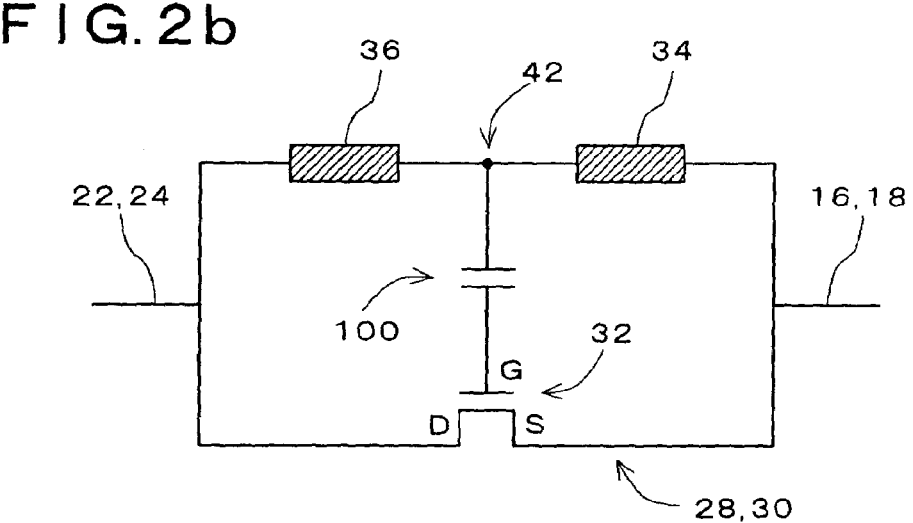

A liquid crystal display according to a first embodiment of the present invention is described with reference to FIG. 1, FIG. 2a and FIG. 2b. First, a schematic structure of the liquid crystal display according to this embodiment is described with reference to FIG. 1. FIG. 1 shows a part of a substrate 1 on an array side of this liquid crystal display viewing toward a substrate surface. It will be noted that inside of a pixel area shows an equivalent circuit for driving liquid crystal. On the substrate 1 on the array side, a plurality of gate bus lines 2 extending in the horizontal direction in the diagram are formed in parallel in the vertical direction. Furthermore, although omitted in the diagram, an insulation film is formed on the plurality of gate bus lines 2, and a plurality of data bus lines 4 are formed on the insulation film in substantially orthogonal to the gate bus lines 2. Each area decided by the gate bus lines 2 and the data bus lines 4 which cross orthogonally to each other in a matrix shape becomes a pixel area, and a TFT 6 and a display electrode 8 are formed in each pixel area. A gate electrode of the TFT 6 is connected to a predetermined gate bus line 2, a drain electrode is connected to a predetermined data bus line 4, and a source electrode is connected to the display electrode 8 in the pixel area. A dotted line 14 in the diagram shows an end portion of an opposing substrate. On the opposing substrate side, common electrode 12 is formed. Liquid crystal 10 is sealed between the substrate 1 on the array side and the opposing substrate.

The TFT 6 in which the gate electrode is connected to the gate bus line 2 is set to "On" state by a scanning signal outputted to the predetermined gate bus line 2, and the voltage based on a gradation signal outputted to the data bus line 4 is applied to a pixel electrode 8. On the other hand, a predetermined voltage is also applied to the common electrode 12 on the opposing substrate side and the liquid crystal between the pixel electrode 8 and the common electrode 12 is driven by the voltage applied to the pixel electrode 8 and the common electrode 12.

An external output electrode 16 is formed at the end portion of each gate bus line 2 and an external output electrode 18 is also formed at the end portion of each data bus line 4. A short ring 20 which is a component of an electrostatic protection circuit is formed at the external surrounding of the external output electrodes 16 and 18. The short ring 20 has a common wiring 22 on the gate bus line side and a common wiring 24 on the data bus line side. An electrostatic protection element section 28 which is a component of the electrostatic protection circuit is formed between the common wiring 22 on the gate bus line side and the external output electrode 16 on each of the gate bus line 2. On the other hand, an electrostatic protection element section 30 which is a component of the electrostatic protection circuit is formed between the common wiring 24 on the data bus line side and the external output electrode 18 on each data bus line 4.

Next, a circuit structure and operation of the electrostatic protection element sections 28 and 30 according to this embodiment is described with reference to FIG. 2a. It will be noted that since the structure and operation of the electrostatic protection element section 28 and the electrostatic protection element section 30 are the same, hereinafter, the electrostatic protection element section 28 is described as an example. The electrostatic protection element section 28 has a TFT 32, a first resistor 34 and a second resistor 36. A source electrode (S) of the TFT 32 which is an electrostatic protection element is connected to the external output electrode 16 on the gate bus line 2. On the other hand, a drain electrode (D) is connected to the common wiring 22. A gate electrode (G) of the TFT 32 is connected to the external output electrode 16 by the first resistor 34 and at the same time, the gate electrode (G) of the TFT 32 is connected to the common wiring 22 by the second resistor 36. When a positive high voltage generates to the bus line with respect to the common wiring 22 due to static electricity, the voltage with the value which divides the high voltage generated due to the static electricity with the first resistor 34 and the second resistor 36 is applied to the gate electrode (G) of the TFT 32. As a result, since the conductivity of the TFT 32 rapidly increases, electric charges due to static electricity are released via the TFT 32. At this time, the electric charges are released not only via the TFT 32 but also via the first and the second resistors 34 and 36. The current flowing in the TFT 32 is relieved in comparison with the case where the TFT is a single unit as shown in FIGS. 29a and 29b and is further superior in redundancy as the electrostatic protection element to a protection circuit shown in FIG. 30. Therefore, the liquid crystal display having the electrostatic protection circuit which is not easily destroyed by static electricity and in which TFT tests can also be sufficiently performed can be fabricated.

Next, a circuit structure of the electrostatic protection element sections 28(=30) according to another example is described with reference to FIG. 2b. The electrostatic protection element section 28 has the TFT 32, the first resistor 34, the second resistor 36, a conductor 42, and a capacitor 100.

The gate electrode (G) of the TFT 32 is connected to the conductor 42 which is electrically insulated from either the external output electrode 16 of the bus line 2 or the common wiring 22. The first resistor 34 is connected between the external output electrode 16 and the conductor 42. The second resistor 36 is connected between the common wiring 22 and the conductor 42.

The capacitor 100 is formed between the conductor 42 and the gate electrode (G) of the TFT 32. When static electricity is generated, the operation of the TFT 32 becomes gentle due to the capacitor 100. Further, since the capacitor 100 is added, the redundancy against defects due to shortage is also improved.

Figure 3:
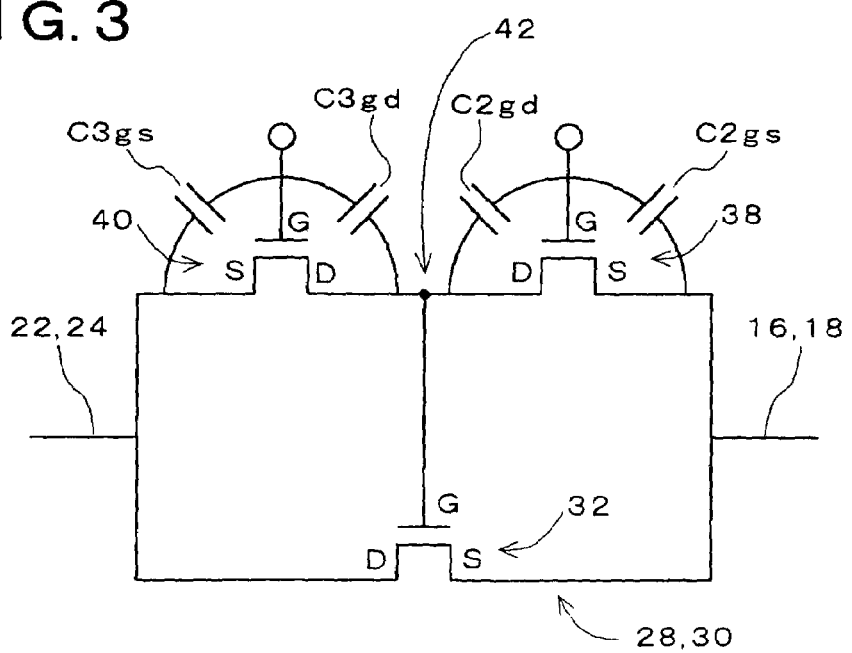
Figure 4A:
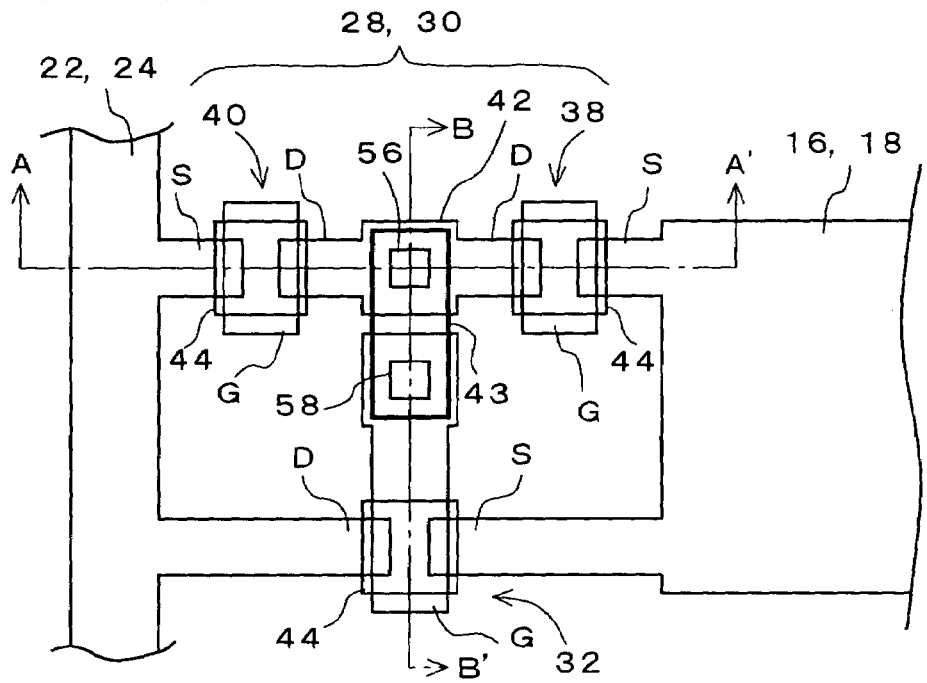
Figure 4B:
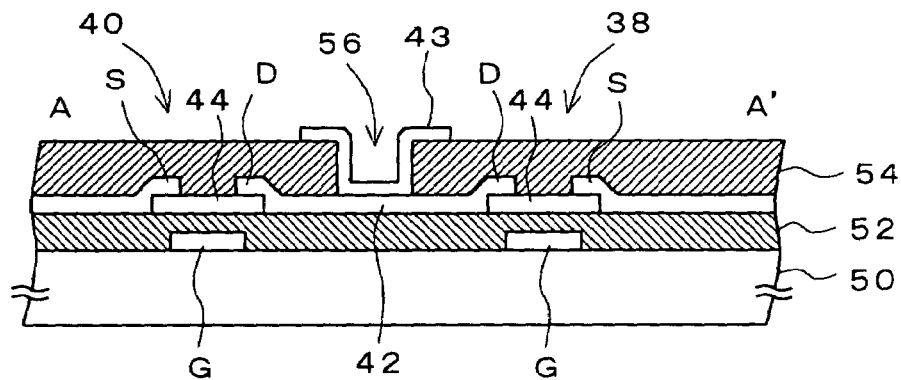
Figure 4C:
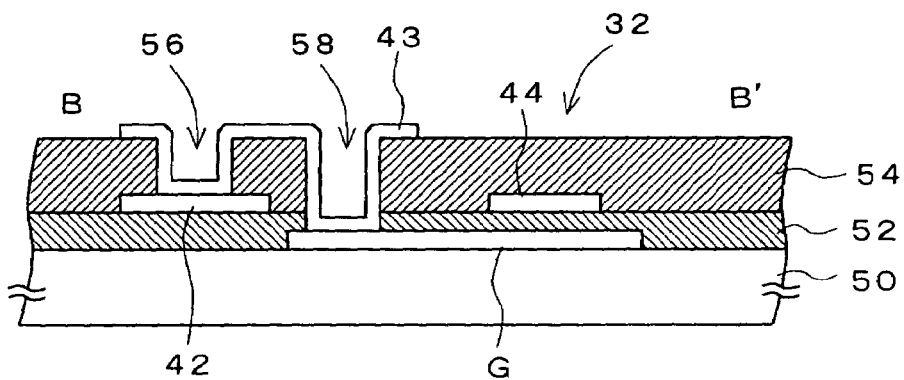
Figure 5:
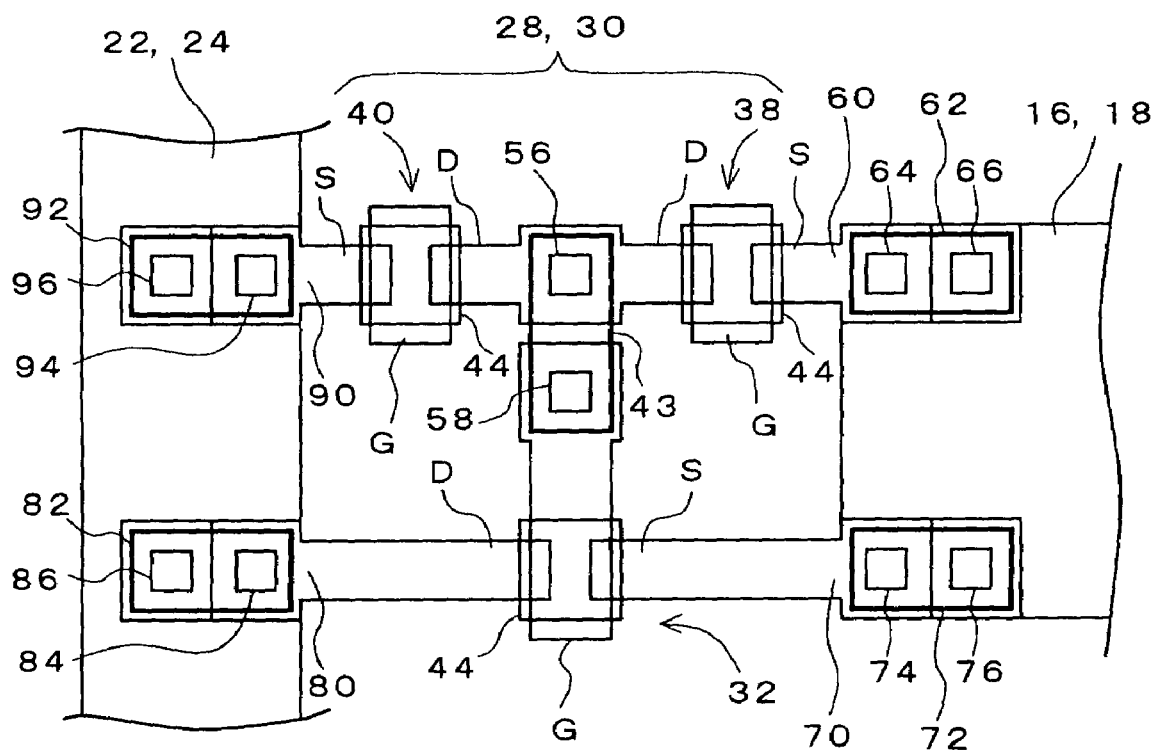
FIG. 5 is a diagram showing an example of a variation of the electrostatic protection circuit of the liquid crystal display according to the second embodiment of the present invention.

Next, a liquid crystal display according to a second embodiment of the present invention is described with reference to FIG. 3 through FIG. 5. Since a schematic structure of this liquid crystal display is similar to FIG. 1 used in the first embodiment, description is omitted, and a circuit structure of the electrostatic protection element sections 28 and 30 which are characteristic components is described with reference to FIG. 3. The electrostatic protection element section 28 has the first through the third TFT's 32, 38 and 40, and a conductor 42. The source electrode (S) of the first TFT 32 which is the electrostatic protection element is connected to the external output electrode 16 of the bus line 2, and the drain electrode (D) on the other side is connected to the common wiring 22. The gate electrode (G) of the first TFT 32 is connected to the conductor 42 which is electrically insulated from either the external output electrode 16 of the bus line 2 or the common wiring 22. On the other hand, the source electrode (S) of the second TFT 38 is connected to the external output electrode 16 and the drain electrode (D) on the other side is connected to the conductor 42. Further, the drain electrode (D) of the third TFT 40 is connected to the conductor 42 and the source electrode (S) on the other side is connected to the common wiring 22. Furthermore, the gate electrode (G) of the second and the third TFT's 38 and 40 are not connected to any patterns and are isolated. When a positive high voltage is generated to the bus line with respect to the common wiring 22 by static electricity, a high voltage internally divided by each parasitic capacitor ($C2_{gs}$, $C2_{gd}$, $C3_{gs}$, $C3_{gd}$) is applied to the gate electrodes (G) of the second and the third TFT's 38 and 40 and a channel is formed in the second and third TFT's 38 and 40. As a result, the current flows through the second and the third TFT's 38 and 40, and the potential of the conductor 42 also increases. Hence, a channel is formed in the first TFT 32 and the conductivity increases, thereby releasing the electric charges due to static electricity. According to this embodiment, since the current preliminarily flows to the second and the third TFT's 38 and 40 in this manner, a load on the first TFT 32 is reduced and the redundancy of the electrostatic protection circuit can be improved. Further, the gate electrode (G) of the first TFT 32 is connected to the external output electrodes 16 and 18 via the capacitors and to the common wirings 22 and 24 of the short ring 20, and the potential of the gate electrode (G) gently varies for only the time required to charge and discharge these capacitors. Therefore, according to the structure in this embodiment, gentle static electricity can be sufficiently dealt with.

Since the electric charges are released through a plurality of paths in this manner, in comparison with the case in the past where there is a single TFT, the load to the first TFT is relieved. Further, since the redundancy as the electrostatic protection element increases, the liquid crystal display having the electrostatic protection circuit which is not easily destroyed by static electricity and in which TFT tests can also be performed sufficiently can be fabricated.

Next, a structure of the electrostatic protection circuit according to this embodiment is described with reference to FIGS. 4a, 4b and 4c. FIG. 4a shows a single electrostatic protection circuit on the substrate 1 on the array side viewing toward the substrate surface. FIG. 4b shows a cross section cut at a line A-A' in FIG. 4a. FIG. 4c shows a cross section cut at a line B-B' in FIG. 4a.

In FIG. 4a, the electrostatic protection element section 28 (or 30, hereinafter, description omitted) is formed between the common wiring 22 (or 24, hereinafter, description omitted) extending vertically in the left side of the diagram and the external output electrode 16 (or 18, hereinafter, description omitted). As shown in FIGS. 4b and 4c, when the gate bus line 2 and the gate electrode of the TFT 6 (refer to FIG. 1) in the pixel area are formed on a glass substrate 50, the gate electrodes (G) of the first through the third TFT's 32, 38 and 40 are also simultaneously formed. The gate electrodes (G) of the second and the third TFT's 38 and 40 are formed electrically floated from other wiring structures. A gate insulation film 52 is formed on the gate electrodes (G) and the glass substrate 50. An operating semiconductor layer 44 made of a-Si is patterned individually on the gate insulation film 52 formed on each gate electrode (G) of the first through the third TFT's 32, 38 and 40. The data (drain) bus line 4 and a source/drain electrode patterned when simultaneously forming the external output electrode 16 are formed on both sides sandwiching each operating semiconductor layer 44. End portions of each source/drain electrode lie over each operating semiconductor layer 44. When viewing toward the substrate surface, an area, where the end portion of each source/drain electrode and the lower layer gate electrode (G) overlap, is formed. Further, the short ring 22 is also simultaneously formed when the data bus line 4 is formed. A passivation film 54 is formed on a whole surface of the element formation area.

A contact hole 56 is formed by removing the passivation film 54 on substantially the center of the source/drain electrode between the second and the third TFT's 38 and 40. Similarly, a contact hole 58 is formed by removing the gate insulation film 52 and the passivation film 54 on an end portion of the gate electrode of the first TFT 32. A portion substantially the center of the source/drain electrode between the second and the third TFT's 38 and 40 and the gate electrode of the first TFT 32 are connected by an ITO layer 43 constructing a part of the conductor via the two contact holes 56 and 58. In this example, an ITO layer 42 which is a component of the conductor 42 is simultaneously formed when patterning the ITO as a transparent electrode for forming a display electrode in each pixel area.

In the structure shown in FIGS. 4a, 4b and 4c, both of the external output electrodes 16 and 18 and the common wirings 22 and 24 of the short ring 20 are formed simultaneously with the formation of the data bus line 4 and by the same formation material as the data bus line 4. However, this is not essential. For example, as shown in FIG. 5, the external output electrodes 16 and 18 and the short rings 22 and 24 may also be formed simultaneously with the formation of the gate bus line 2 and by the same metal layer as the gate bus line 2. FIG. 5 shows a state in which an electrostatic protection circuit on the substrate 1 on the array side is viewed toward the substrate surface. As shown in FIG. 5, a source electrode 70 of the first TFT 32 to be connected with the external output electrodes 16 and 18 is connected at an ITO layer 72 which is a layer when forming the display electrode, via a contact hole 74 formed on an end portion of the source electrode 70 and a contact hole 76 formed on the external output electrodes 16 and 18. Similarly, a source electrode 60 of the second TFT 38 to be connected with the external output electrodes 16 and 18 is connected by an ITO layer 62 which is a layer when forming the display electrode, via a contact hole 64 formed on an end portion of the source electrode 60 and a contact hole 66 formed on the external output electrodes 16 and 18. Further, in the same manner, a drain electrode 80 of the first TFT 32 to be connected with the common wirings 22 and 24 of the short ring 20 and a source electrode 90 of the third TFT 40 are respectively connected by ITO layers 82 and 92 which are layers when forming the display electrode, via contact holes 84 and 94 formed on end portions of the drain electrode 80 and the source electrode 90 and contact holes 86 and 96 formed on the common wirings 22 and 24 respectively.

Figure 6:
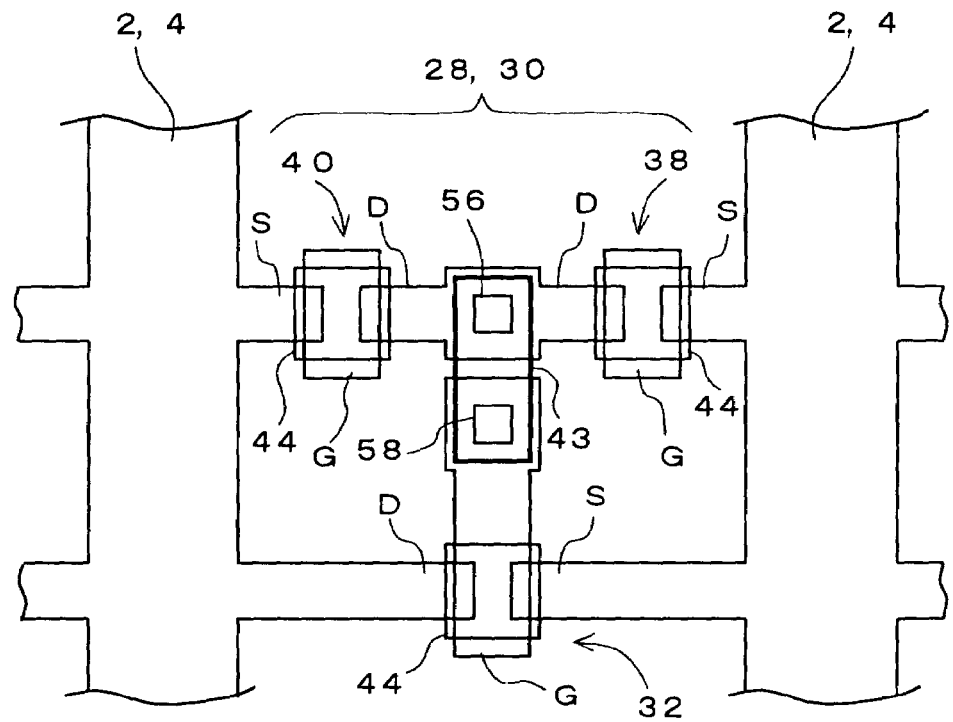
FIG. 6 is a diagram showing a state of an electrostatic protection circuit of a liquid crystal display according to a third embodiment of the present invention when viewing toward a substrate.
Figure 7:
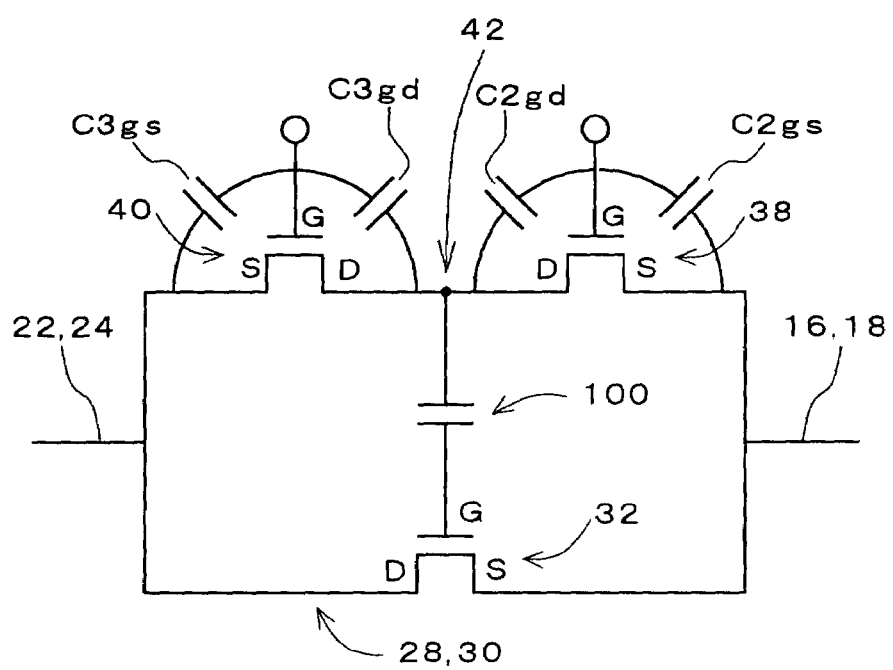
FIG. 7 is a diagram showing a circuit structure of a electrostatic protection element section which is the characteristic component of a liquid crystal display according to a fourth embodiment of the present invention.

Next, a liquid crystal display according to a third embodiment of the present invention is described with reference to FIG. 6. FIG. 6 shows a state of the electrostatic protection circuit on the substrate 1 on the array side when viewing toward the substrate surface. The liquid crystal display according to this embodiment also has distinctive characteristics in the electrostatic protection circuit and since other components are the same as the components described in the first embodiment with reference to FIG. 1, descriptions for the other components are omitted. Further, in the electrostatic protection element section, components having the similar function and operation to the first and the second embodiments are also referred by the same codes and descriptions are omitted. The electrostatic protection circuit according to this embodiment has a distinctive characteristic in forming the electrostatic protection element sections 28 and 30 described in the second embodiment with reference to FIGS. 4a, 4b and 4c between the adjacent bus lines, thereby not forming the short ring 20. In other words, the source electrode of the first TFT 32 is connected to one of the two adjacent bus lines 2 (or 4, hereinafter, description omitted), and the drain electrode is connected to the other of the two adjacent bus lines 2. Further, the source electrode of the second TFT 38 is connected to one of the two adjacent bus lines 2 and the source electrode of the third TFT 40 is connected to the other of the two adjacent bus lines 2. Except for the differences in the structure above, the similar effects to the second embodiment can be obtained by the electrostatic protection circuit according to this embodiment.

Next, a liquid crystal display according to a fourth embodiment of the present invention is described with reference to FIG. 7 through FIG. 11. Since the schematic structure of this liquid crystal display is similar to FIG. 1 used in the first embodiment, description is omitted, and the circuit structure of the electrostatic protection element portions 28 and 30 which are characteristic components is described with reference to FIG. 7. However, components exhibiting the similar functions and operations to the structures shown in FIGS. 3, 4a, 4b and 4c are referred by the same codes and descriptions are omitted.

The electrostatic protection element portion 28 according to this embodiment, as is the case in the second embodiment, has the first through the third TFT's 32, 38 and 40 and the conductor 42. The difference from the second embodiment is to have a capacitor 100. The capacitor 100 is formed between the conductor 42 and the gate electrode (G) of the first TFT 32. When static electricity is generated, the operation of the first TFT 32 becomes gentle due to the capacitor 100 in comparison with the second and the third TFT's 38 and 40. Therefore, in the case of static electricity generating sharp pulse-like variations in voltage, the current first flows to the second and the third TFT's 38 and 40, thereby protecting the first TFT 32. Further, in the case of static electricity generating a gentle increase in voltage, following the second and the third TFT's 38 and 40, the first TFT 32 operates and contributes for releasing the electric charges. According to this embodiment, since the current preliminarily flows to the second and the third TFT's 38 and 40 in this manner, the load on the first TFT 32 is reduced and the redundancy of the electrostatic protection circuit can be improved. Furthermore, since the gate electrode (G) of the first TFT 32 is connected with the external output electrodes 16 and 18 and the common wirings 22 and 24 of the short ring 20 via the capacitor, the potential of the gate electrode (G) varies gently for a time required to charge and discharge these capacitors. Therefore, according to the structure in this embodiment, gentle static electricity can be sufficiently dealt with. Also, according to this embodiment, since the capacitor 100 is inserted between the gate electrode (G) of the first TFT 32 and the common conductor 42 between the second and the third TFT's 38 and 40, even if the difference in potential between the external output electrodes 16 and 18 and the common wirings 22 and 24 of the short ring 20 is reduced, a state of continuity can be kept still longer for a time required to charge and discharge the capacitor 100, and the efficiency in charge release can be further improved. Further, since the capacitor 100 is added, the redundancy against defects due to shortage is also improved. In this embodiment, since the electric charges are also released through a plurality of paths, the redundancy as the electrostatic protection element increases in comparison with the case in the past where there is a single TFT, therefore the protection circuit which is not easily destroyed by static electricity can be formed.

Next, a structure of the electrostatic protection circuit according to this embodiment is described with reference to FIGS. 8a, 8b and 8c. FIG. 8a shows a state of a single electrostatic protection circuit on the substrate 1 on the array side when viewing toward the substrate. FIG. 8b shows a cross section cut at a line A-A' in FIG. 8a. FIG. 8c shows a cross section cut at a line B-B' in FIG. 8a.

In FIG. 8a, the electrostatic protection element portion 28 is formed between the common wiring 22 extending vertically in the left side of the diagram and the external output electrode 16. As shown in FIGS. 8b and 8c, when the gate bus line 2 and the gate electrode of the TFT 6 (refer to FIG. 1) in the pixel area are formed, the gate electrodes (G) of the first through the third TFT's 32, 38 and 40 are also simultaneously formed on the glass substrate 50. The gate electrodes (G) of the second and the third TFT's 38 and 40 are formed electrically floated from other wiring structures. The gate insulation film 52 is formed on the gate electrodes (G) and the glass substrate 50. The operating semiconductor layer 44 made of a-Si is patterned individually on the gate insulation film 52 formed on each gate electrode (G) of the first through the third TFT's. The source/drain electrode is simultaneously patterned when the data (drain) bus line 4 and external output electrode 16 are formed on both sides sandwiching each of the operating semiconductor layer 44. The end portions of each source/drain electrode are formed lying over each operating semiconductor layer 44. Further, the short ring 22 is also simultaneously formed when the data bus line 4 is formed. The passivation film 54 is formed on the whole surface of the element formation area.

The source/drain electrode between the second and the third TFT's 38 and 40 functions as the conductor 42 and also forms the capacitor 100 between the source/drain electrode and the gate electrode (G) of the first TFT 32 extending to the lower part of the conductor 42.

In the structure shown in FIGS. 8a, 8b and 8c, the external output electrodes 16 and 18 and the short rings 22 and 24 are formed simultaneously with the formation of the data bus line 4 and by the same formation material as the data bus line 4. However, this is not essential. For example, as shown in FIG. 9, the external output electrodes 16 and 18 and the short rings 22 and 24 may also be formed simultaneously by the same metal layer as the gate bus line 2 when the gate bus line 2 is formed. The structure shown in FIG. 9 can be obtained by changing the connections of the wirings in the same manner as described with reference to FIG. 5.

Next, an example of a variation of the electrostatic protection circuit according to this embodiment is described with reference to FIG. 10 and FIG. 11. In the first and the second embodiments and this embodiment, the short ring 20 and the electrostatic protection element sections 28 and 30 are arranged outside the external output electrodes 16 and 18 on the substrate on the array side. Therefore, the short ring 20 and the electrostatic protection element sections 28 and 30 can be removed by a beveling process after panel scribing. On the other hand, if the short ring 20 is arranged inside the external output electrodes 16 and 18, the glass substrate can be efficiently utilized without waste by reducing an area for scribing on the glass substrate. In this case, the short ring 20 and the electrostatic protection element sections 28 and 30 remain in the liquid crystal panel even after panel scribing and each of the bus lines 2 and 4 is short-circuited via the electrostatic protection circuit. However, the resistance is so large that an interference between each bus line can be ignored and the quality of a product is not at all affected. A position to form the short ring 20 can be considered in the same manner as in all embodiments to be described hereinafter.

FIG. 10 shows an example of the electrostatic protection circuit structure forming the common wiring 24 of the short ring 20 inside the external output electrode 18 of the data bus line 4. The electrostatic protection element section 30 is formed between the common wiring 24 extending vertically in the diagram and the pixel area (opposite side of the external output electrode 18 with respect to the common wiring 24) which is not identified in the diagram. The gate electrodes (G) of the first through the third TFT's 32, 38 and 40 are simultaneously formed on the glass substrate 50 when the gate bus line 2 and the gate electrode of the TFT 6 (refer to FIG. 1) in the pixel area are formed. The gate electrodes (G) of the second and the third TFT's 38 and 40 are formed electrically floated from the other wiring structures. Further, the common wiring 24 is also formed simultaneously when the gate bus line 2 is formed. The drain electrode (D) of the first TFT 32 and the drain electrode (D) of the third TFT 40 are connected to the common wiring 24 via a contact hole portion 77.

The source/drain electrode between the second and the third TFT's 38 and 40 functions as the conductor 42 and also forms the capacitor 100 between the source/drain electrode and the gate electrode (G) of the first TFT 32 extending to the lower part of the conductor 42.

Further, in this example, the channel lengths of the second and the third TFT's 38 and 40 are formed shorter than the channel length of the first TFT 32. Thus, when static electricity producing extremely sharp pulse-like voltage is generated in the data line 4, the second or the third TFT's 38 or 40 are first destroyed before the first TFT 32 is destroyed, thereby protecting the first TFT 32. Therefore, even if any one of the second and the third TFT's 38 and 40 is destroyed, the data bus line 4 and the common wiring 24 do not directly short-circuit and do not provide an obstacle in sequential processes including TFT tests. Furthermore, in this example, the channel lengths of the second and third TFT's 38 and 40 are the same and are at the same time equal to approximately half the channel length of the first TFT 32. Also, the channel widths of the second and the third TFT 38 and 40 are the same and are at the same time approximately the same width as the channel width of the first TFT 32. Therefore, the conductivity of the first TFT 32 and the conductivity of the second and the third TFT's 38 and 40 when observed serially are approximately the same, and the current can be divided into approximately halves by the first TFT 32 and the second and the third TFT's 38 and 40.

FIG. 11 shows an example of the electrostatic protection circuit structure forming the common wiring 22 of the short ring 20 inside the external output electrode 16 of the gate bus line 2. The electrostatic protection element section 28 is formed between the common wiring 22 extending vertically in the diagram and the pixel area (opposite side of the external output electrode 16 with respect to the common wiring 22) which is not identified in the diagram. The gate electrodes (G) of the first through the third TFT's 32, 38 and 40 are simultaneously formed on the glass substrate 50 when the gate bus line 2 and the gate electrode of the TFT 6 (refer to FIG. 1) in the pixel area are formed. The gate electrodes (G) of the second and the third TFT's 30 and 40 are formed electrically floated from the other wiring structures.

The source/drain electrodes of the first through the third TFT's 32, 38 and 40 and the common wiring 22 are formed simultaneously with the formation of the data bus line and by the same formation material as the data bus line. The source electrode (S) of the first TFT and the source electrode (S) of the second TFT 38 are connected to the gate bus line 2 via contact hole portions 78 and 79 respectively.

The source/drain electrode between the second and the third TFT's 38 and 40 functions as the conductor 42 and also forms the capacitor 100 between the source/drain electrode and the gate electrode (G) of the first TFT extending to the lower part of the conductor 42.

Further, in this example, as is the case shown in FIG. 10, the channel lengths of the second and third TFT's 38 and 40 are the same and are at the same time equal to approximately half the channel length of the first TFT 32. Also, the channel widths of the second and the third TFT 38 and 40 are the same and are at the same time approximately the same width as the channel width of the first TFT 32. Therefore, the conductivity of the first TFT 32 and the conductivity of the second and the third TFT's 38 and 40 when observed serially are approximately the same, and the current can be divided into approximately halves by the first TFT 32 and the second and the third TFT's 38 and 40.

Next, a liquid crystal display according to a fifth embodiment of the present invention is described with reference to FIG. 12 and FIG. 13. While in the first through the fourth embodiments described above, a set of electrostatic protection element sections are respectively formed in each bus line, the liquid crystal display holding the elements formed in the electrostatic protection element section in common as much as possible and reducing the number of whole elements is shown in this embodiment. When a generation ratio of component defects, an area occupied by the elements and the like are considered, reducing the number of structuring elements as much as possible is more desirable.

A circuit of the electrostatic protection element section according to this embodiment is shown in FIG. 12. As shown in FIG. 12, in electrostatic protection element sections 28-1 and 28-2 (or 30-1 and 30-2), TFT's 32-1 and 32-2 and the first resistors 34-1 and 34-2 are formed at each of the external output electrodes 16-1 and 16-2 (or 18-1 and 18-2). The second resistor 36 is not formed in each of the element sections 28-1 and 28-2. Instead, the conductor 42, to which the electrodes (G) of the first TFT's 32-1 and 32-2 are connected, and the common wirings 22 and 24 are connected at a single common resistor 37 as the second resistor. By providing the common resistor 37, the number of elements structuring the electrostatic protection element sections can be reduced to ¾ in comparison with the first through the fourth embodiments.

For example, if a positive high voltage is generated in the bus line of the external output electrode 16 against the common wiring 22 due to static electricity, the voltage value obtained by dividing the high voltage generated due to static electricity by the first resistor 34-1 and the common resistor 37 is applied to the gate electrodes (G) of TFT's 32-1 and 32-2. As a result, since the conductivity of TFT's 32-1 and 32-2 rapidly increase, the electric charges due to static electricity is released via TFT's 32-1 and 32-2. At this time, since the electric charges are released not only via TFT's 32-1 and 32-2 but also via the first resistors 34-1 and 34-2 and the common resister 37 and the current flowing through the TFT 32-1 is relieved, the redundancy as the electrostatic protection element increases, thereby realizing the electrostatic protection circuit which is not easily destroyed by static electricity.

Next, an example of a variation of this embodiment is described with reference to FIG. 13. In order to reduce the number of elements structuring the electrostatic protection circuits as much as possible, the structure shown in FIG. 12 is further proceeded. The structure shown in FIG. 13 has a distinctive characteristic in using a single common resistor 37 in common among the electrostatic protection element sections 28-1 through 28-n (or 30-1 through 30-n) of more than n (n is an integer of more than 3) bus lines.

In the electrostatic protection element sections 28-1 through 28-n provided at each of the external output electrodes 16-1 through 16-n, TFT's 32-1 through 32-n and the first resistor 34-1 through 34-n are respectively formed. The second resistor 36 is not formed in each of the element sections 21-1 through 28-n. Instead, the conductor 42 to which the gate electrodes (G) of the first TFT's 32-1 through 32-n are connected and the common wirings 22 and 24 are connected by the common resistor 37 as the single second resistor in place of individual second resistors.

If the common resistor 37 is used in place of individual second resistors in the electrostatic protection element sections 28 and 30 of all the bus lines, the number of structuring elements per a bus line can be approximately 2 and the number of elements used in the electrostatic protection circuits according to the first embodiment can be reduced to approximately half.

Next, a liquid crystal according to a sixth embodiment of the present invention is described with reference to FIG. 14 through FIG. 17. While in the liquid crystal display according to the second embodiment above, a set of electrostatic protection element sections are respectively formed in each bus line, in this embodiment as is the case in the fifth embodiment, the liquid crystal display holding the elements formed in the electrostatic protection element section in common as much as possible and reducing the number of whole elements is shown.

A circuit of the electrostatic protection element section according to this embodiment is shown in FIG. 14. As shown in FIG. 14, in electrostatic protection element sections 28-1 and 28-2 (or 30-1 and 30-2), the first TFT's 32-1 and 32-2 and the second TFT's 38-1 and 38-2 are formed at each of the external output electrodes 16-2 and 16-2 (or 18-1 and 18-2). The third TFT 40 is not formed in each of the element sections 28-1 and 28-2. Instead, the conductor 42 to which the electrodes (G) of the first TFT's 32-1 and 32-2 are connected and the common wirings 22 and 24 are connected at a common TFT 41 as the single third TFT in place of the third individual TFT. By providing the common TFT 41, the number of elements structuring the electrostatic protection element sections can be reduced to ¾ in comparison with the first through the fourth embodiments.

For example, if a positive high voltage is generated in the bus line of the external output electrode 16-1 against the common wiring 22 due to static electricity, the high voltage interior-divided by each parasitic capacitor ($C2_{gs}$, $C2_{gd}$, $Cc_{gs}$, $Cc_{gd}$) is applied to the second TFT 38-1 and the gate electrode (G) of the common TFT 41 and channels are formed in the second TFT 38-1 and the common TFT 41. As a result, the current flows through the second TFT 38-1 and the common TFT 41, and the potential of the conductor 42 also increases. Hence, a channel is formed in the first TFT 32-1 and the conductivity increases, thereby releasing the electric charges due to static electricity. Since the electric charges are also released through a plurality of paths in this case, the amount of the electric charges flowing in the first TFT 32 is relieved in comparison with the case in the past having a single TFT. Therefore, the redundancy as the electrostatic protection element increases and the protection circuit which can not be easily destroyed by static electricity can be formed.

Next, the structure of the electrostatic protection circuit according to this embodiment is described with reference to FIG. 15. FIG. 15 shows a state of a single electrostatic protection circuit on the substrate 1 on the array side when viewing toward the substrate surface. In FIG. 15, the electrostatic protection element sections 28-1 and 28-2 are formed between the common wiring 22 extending vertically on the left side of the diagram and the external output electrodes 16-1 and 16-2.

In this example, the conductor 42 extends vertically in the diagram and is connected to the first TFT 32-1 of the electrostatic protection element section 28-1 side by the ITO layer 43 via contact holes 56-1 and 58-1. Further, the conductor 42 is connected to the first TFT 32-2 of the electrostatic protection element section 28-2 side by the ITO layer 43 via contact holes 56-2 and 58-2.

The operating semiconductor layer 44 made of a-Si is patterned on the gate insulation film on the gate electrode (G) of the common TFT 41. The drain electrode (D) of the common TFT 41 pulled out from substantially the center portion of the conductor 42 is connected at both sides sandwiching the operating semiconductor layer 44. The source electrode of the common TFT 41 is connected to the common wirings 22 and 24. End portions of the source/drain electrode of the common TFT 41 lie over the operating semiconductor layer 44 and areas where end portions of each source/drain electrode and the under-layer gate electrodes (G) overlap are formed. The conductor 42, the external output electrodes 16-1 and 16-2 and the common wirings 22 and 24 are simultaneously formed when the data bus line 4 is formed.

Next, an example of a variation of this embodiment is described with reference to FIG. 16. In order to reduce the number of elements structuring the electrostatic protection circuits as many as possible, the structure shown in FIG. 15 is further proceeded. The structure shown in FIG. 16 has a distinctive characteristic in using a single common TFT 41 among the electrostatic protection element sections 28-1 through 28-n (or 30-1 through 30-n) of more than n (n is an integer of more than 3) bus lines.

In the electrostatic protection element sections 28-1 through 28-n provided at each of the external output electrodes 16-1 through 16-n, the first TFT's 32-1 through 32-n and the second TFT's 38-1 through 38-n are respectively formed. The third TFT 40 is not formed in each of the element sections 28-1 through 28-n. Instead, the conductor 42 to which the gate electrodes (G) of the first TFT's 32-1 through 32-n are connected and the common wirings 22 and 24 are connected at the common TFT 41 as the single third TFT in place of individual third TFT.

If the common TFT 41 is used in place of the third TFT 40 in the electrostatic protection element sections 28 and 30 of all the bus lines, the number of structuring elements per a bus line can be approximately 2 and the number of elements used in the electrostatic protection circuits according to the second embodiment can be reduced to approximately half.

Next, the structure of the electrostatic protection circuit according to this embodiment is described with reference to FIG. 17. FIG. 17 shows a state of a single electrostatic protection circuit on the substrate 1 on the array side when viewing toward the substrate surface. In FIG. 17, the electrostatic protection element sections 28-1 and 28-n are formed between the common wiring 22 extending vertically in the left side on the diagram and the external output electrodes 16-1 and 16-n.

In this example, the conductor 42 extends vertically in the diagram and is connected to the gate electrodes of a plurality of the first TFT's 32-1 through 32-n. Further, the second TFT's 38-1 through 38-n are connected to the conductor 42 by the ITO layer 43 via contact holes. Since the structure of the common TFT 41 is the same as the structure described with reference to FIG. 15, description is omitted. The drain electrode of the common TFT 41 is connected to the conductor 42 by the ITO layer 43 via contact holes and the source electrode is connected to the common wirings 22 and 24.

Next, a liquid crystal display according to a seventh embodiment of the present invention is described with reference to FIG. 18 through FIG. 21. While a set of electrostatic protection element sections are respectively formed in each bus line in the liquid crystal display according to the third embodiment above, in this embodiment as is the case in the fifth and sixth embodiments, the liquid crystal display holding the elements formed in the electrostatic protection element section in common as much as possible and reducing the number of whole elements is shown.

The circuit of the electrostatic protection element section according to this embodiment is shown in FIG. 18. As shown in FIG. 18, capacitors 100-1 and 100-2 are formed in each of the electrostatic protection element sections 28-1 and 28-2. The third TFT 40 is not formed in each of the element sections 28-1 and 28-2. Instead, the conductor 42 to which the electrodes (G) of the first TFT's 32-1 and 32-2 are connected and the common wirings 22 and 24 are connected at a common TFT 41 as the single third TFT in place of the third individual TFT. By providing the common TFT 41, the number of elements structuring the electrostatic protection element sections can be reduced to ¾ in comparison with the first through the fourth embodiments.

According to this embodiment, by having the capacitor 100, operations of the first TFT's 32-1 and 32-2 when static electricity is generated also become gentle in comparison with operations of the second TFT's 38-1 and 38-2 and the common TFT 41. Therefore, in the case of static electricity generating sharp pulse-like variations in voltage, the current first flows to the second TFT's 38-1 and 38-2 and the common TFT 41, thereby protecting the first TFT's 32-1 and 32-2. Further, in the case of static electricity gently increasing in voltage, the first TFT's 32-1 and 32-2 operate following the second TFT's 38-1 and 38-2 and the common TFT 41 and contribute to the release of the electric charge. According to this embodiment, since the current preliminarily flows to the second TFT's 38-1 and 38-2 and the common TFT 41, the load on the first TFT's 32-1 and 32-2 is reduced, thereby increasing the redundancy of the electrostatic protection circuit. Further, the gate electrodes of the first TFT's 32-1 and 32-2 are respectively connected with the external output electrodes 16-1, 18-1, 16-2 and 18-2 and the common wirings 22 and 24 of the short ring 20 via the capacitors, and the potential of the gate electrode (G) gently varies for a time required to charge and discharge these capacitors. Therefore, according to the structure of this embodiment, even gentle static electricity can be sufficiently dealt with. Furthermore, in this embodiment, since the capacitors 100-1 and 100-2 are inserted between the gate electrodes (G) of the first TFT's 32-1 and 32-2 and the common conductor 42 between the second TFT's 38-1 and 38-2 and the common TFT 41, even if the potential difference between the external output electrodes 16 and 18 and the common wirings 22 and 24 of the short ring 20 is reduced, continuity state can be maintained still longer for a time required to charge and discharge the capacitors 100-1 and 100-2, thereby further improving the efficiency of charge release. Also, by adding the capacitors 100-1 and 100-2, the redundancy against defects due to shortage is improved. Since the electric charges are also released through a plurality of paths in this embodiment, the redundancy as the electrostatic protection element increases in comparison with the case in the past having a single TFT and destruction of elements due to static electricity does not easily occur.

Next, the structure of the electrostatic protection circuit according to this embodiment is described with reference to FIG. 19. FIG. 19 shows a state of a single electrostatic protection circuit on the substrate 1 on the array side when viewing toward the substrate. The first distinctive characteristic of the structure shown in FIG. 19, with respect to the structure shown in FIG. 15 is that the capacitors 100-1 and 100-2 are formed by positioning the gate electrodes of the first TFT's 32-1 and 32-2 at the lower layer of the conductor 42 via the insulation film. Since other structures are the same as the structure shown in FIG. 15, description is omitted.

Next, an example of a variation of this embodiment is described with reference to FIG. 20 and FIG. 21. In order to reduce the number of elements structuring the electrostatic protection circuits as many as possible, the structure shown in FIG. 18 is further proceeded. The structures shown in FIGS. 20 and 21 have a distinctive characteristic in using a single common TFT 41 among the electrostatic protection element sections 28-1 through 28-n (or 30-1 through 30-n) of more than n (n is an integer of more than 3) bus lines. The distinctive characteristic of the circuit structure and element structure shown in FIGS. 20 and 21, with respect to the circuit structure and element structure shown in FIGS. 16 and 17, is that the capacitors 100-1 through 100-n are formed by positioning the gate electrodes of the first TFT's 32-1 through 32-n at the lower layer of the conductor 42 via the insulation film. Since other structures are the same as the structures shown in FIGS. 16 and 17, description is omitted.

In the fabrication process of the TFT for the substrate 1 on the array side where the electrostatic protection circuit according to the first through the seventh embodiments described above is formed, the quality of the panel may be judged by an open/short inspection (O/S inspection), not by a TFT test, for simply detecting a disconnection/shortage of the bus line. In this case, in order to detect an interlayer shortage, the common wiring 22 of the short ring 20 on the gate bus line 2 side and the common wiring 24 on the data bus line 4 side are required to be electrically separated by a high resistive component. Accordingly, the structure shown in FIG. 22 can be taken as an example. In FIG. 22, for example, an interlayer separation portion 23 having the similar structure to the electrostatic protection element portions 28 and 30 described with reference to FIG. 2 through FIG. 11 in the first through the fourth embodiments is formed at an intersection of the common wiring 22 and the common wiring 24.

Further, as shown in FIG. 22, by connecting either the common wiring 22 or 24 (the common wirings 22 in FIG. 22) of the short ring 20 to, for example, the common electrode 12 on the opposing substrate side or to a connecting terminal 25 connected to ground, the TFT's and the bus lines can also be protected even more certainly from obstacles due to static electricity.

Next, a liquid crystal display according to an eighth embodiment of the present invention is described. To begin with, a fabrication process of the substrate on the array side for a TFT-LCD used in this embodiment is briefly described. First, a gate metal is deposited and patterned on the substrate on the array side, and the gate bus line and the gate electrode of the TFT in each pixel area are formed. Second, the gate insulation film is formed on the whole surface and an a-Si layer to be an operating semiconductor film of the TFT and an insulation film for forming a channel protection film are deposited in this order on the gate insulation film. Third, by a back exposure using the bus line and the gate electrode as a mask and an exposure using an ordinary mask to electrically separate the a-Si layer from the pixel area, the above insulation film is patterned and the channel protection film is formed. Fourth, an $n^+$ layer to be an ohmic contact layer, the drain/source electrodes and a drain metal (for example, Ti (titanium)) layer to form the data bus line are formed in this order on the whole surface. Fifth, the $n^+$ layer and the drain metal layer are patterned and the drain/source electrodes and the data bus line are formed. Sixth, the passivation film (for example, SiN film (silicon nitride film) is formed and then patterned, and a contact hole is formed at a predetermined position on the passivation film. Seventh, by depositing the ITO on the whole surface and then patterning, the pixel electrode is formed. In the above process, the exposure process is included in the first, third, fifth, sixth and seventh processes, resulting in a five-mask process using five masks in total.

The electrostatic protection circuit of this liquid crystal display formed including the above processes is described in detail with reference to FIGS. 23a through 27. It will be noted that, in this embodiment, the structuring elements having the same function and operation as in the first through the seventh embodiments are designated by the same codes.

FIG. 23a shows a state of the substrate on the array side when viewing toward the substrate. FIG. 23b shows a cross section cut at a line A-A' in FIG. 23a. FIGS. 23a and 23b show a state of the external output electrode 18 pulled out of the data bus line 4 (not shown) on the substrate 1 which is a glass substrate on the array side and formed. The electrostatic protection element section 30 is formed at a tip of the external output electrode 18, and the external output electrode 18 and the common wiring 24 of the short ring 20 are connected via the electrostatic protection element section 30. Although omitted in the diagram, the structures of the gate bus line 2 and its external output electrode 16 are similar to the structures above.

As shown in FIG. 23b, the gate insulation film 52 according to the second process above is formed on the substrate 1 on the array side. The drain metal layer according to the fourth process is patterned and the external output electrode 18 and the common wiring 24 are formed on the gate insulation film 52. Further, a metal layer 200 which patterns the drain metal layer constructing a part of the electrostatic protection element section 30 is formed on the opposite side of the external output electrode 18 and the common wiring 24. The passivation film 54 is embedded between both end portions of the opposing metal layer 200 and the end portions are electrically separated. Contact holes 98 which open the passivation film 54 are respectively formed on both end portions of the opposing metal layer 200. The ITO layer 43 which is a conductive film deposited in the seventh process is patterned on the interior walls of the two contact holes and between the contact holes, and the two opposing metal layers 200 are electrically connected by the ITO layer 43. In this case, the lower layer drain metal (Ti) and the upper layer metal (ITO) form an ohmic connection and a resistive component varies depending on the size of the contact hole. When Ti is used for the lower layer metal, a heat treatment (for example, approximately 180° C. through 215° C.) is performed before depositing the ITO and when the diameter of the contact hole 98 is φ=4 μm, the resistive component to be formed is 7 to 8 kΩ. Since the contact hole 98 is formed in the sixth process above and the ITO film is also formed in the seventh process, the electrostatic protection circuit can be formed without changing the conventional fabrication processes at all.

FIGS. 24a and 24b show examples of variation of this embodiment which serially connects a plurality of contact holes 98 in order to make the electrostatic protection element section 30 to have a high resist. In FIG. 24a, a plurality of island-like metal layers 202 are further formed between the two opposing metal layers 200 where the tips are arranged on the opposing sides of the external output electrode 18 and the common wiring 24. The contact holes 98 are formed on the passivation film 54 on both end portions of the plurality of metal layers 202 lined up linearly. The adjacent metal layers 200 and 202 are electrically connected by the ITO layer 43 via the contact holes 98.

In the structure shown in FIG. 24b, electrically floated island-like metal layers 204 are arranged adjacent to each opposing end portion of the metal layers 200 and 202 lined up linearly, and the contact holes 98 are formed on both end portions of the metal layers 204. Each opposing end portion of the metal layers 200 and 202 is connected at the connection layer of the ITO layer 43 via the metal layer 204 and the contact holes 98. By arranging the electrostatic protection element section 30 in a zigzag line in this manner, the distance between the common wiring 24 and the external output electrode 18 can be reduced.

When reading the electric charges charged between the pixel electrode and the common electrode by an array inspection device using an integration circuit, the resistance value of more than 100 kΩ is desired as an isolation resistance. Therefore, if the number of the contact holes 98 are more than 14 by adopting the structure shown in FIGS. 24a and 24b, the electrostatic protection circuit which does not affect the array inspection can be realized. Thus, according to this embodiment, the electrostatic protection circuit having an arbitrary value of resistive component can be formed by connecting a plurality of steps of the resistors via the contact holes.

Next, an example of a variation which makes the lower layer metal as a multi-layer structure in the electrostatic protection element section according to this embodiment is described with reference to FIG. 25. FIG. 25 shows cross sections of the electrostatic protection element section in the formation process. A column (A) shows the gate bus line side and a column (B) shows the data bus line side. Further, a row (a) through a row (e) show treatments in each process. First, in (a) of FIG. 25, when the gate bus line and the gate electrode of the TFT are formed on the substrate 1 on the array side which is the glass substrate, a metal layer 200g of the electrostatic protection element section 28 on the gate bus line 2 side is simultaneously formed by gate metal. When forming the metal layer 200g, the common wiring 22 of the short ring 20 can also be simultaneously formed by gate metal. Next, the gate insulation film 52 is formed on the whole surface by using, for example, SiN (silicon nitride).

Next, as shown in (b) of FIG. 25, when forming the data bus line 4 and the drain/source electrodes of the TFT, a metal layer 200d of the electrostatic protection element section 30 on the data bus line 4 side is simultaneously formed by using drain metal. The drain metal layer is constructed by Ti/Al/Ti in order from the lower layer. Further, the common wiring 24 of the short ring 20 can also be formed by drain metal simultaneously when forming the metal layer 200d. Next, the passivation film 54 is formed on the whole surface.

Next, as shown in (c) of FIG. 25, the contact hole 98 is formed by opening the passivation film 54 on the metal layers on the metal layers 200g and 200d. Further, as shown in (d) of FIG. 25, the contact hole 98 where the upper portion of the metal layer 200g exposes is formed by etching the gate insulation film 52 on the metal layer 200g. In the process which collectively etches the passivation film 54 and the gate insulation film 52, the top drain metal layer, the Ti layer, functions as an etching stopper during the etching of the gate insulation film 42. At this time, if the thickness of the top drain metal layer Ti is thin, the underlying Al layer may be exposed.

Next, as shown in (e) of FIG. 25, the ITO layer 43 is formed by patterning the ITO when forming the display electrode so that the adjacent metal layers 200, 202 and the like are electrically connected via the contact hole 98. At this time, since an ITO layer 43a and the Al layer of the metal layer 200d form a Schottky connection and the ring-shaped Ti layer remaining in the contact hole 98 and an ITO layer 43b form an ohmic connection, an overall contact resistance can be increased. For example, when the drain metal is Ti(20 nm)/Al(75 nm)/Ti(20 nm), the contact resistance per a contact hole on the metal layer 200d is equal to 35 to 36 kΩ and if 3 or 4 of the metal layers 200d are serially connected, a state possible for the array inspection can be obtained.

It will be noted that by varying the temperature of the heat treatment under the condition that the metal layer is exposed at the bottom of the contact hole 98 and it is before forming the ITO layer 43, the contact resistance of the metal/ITO can be varied. When an element having much higher resistance is required, the baking temperature may be increased.

The resistance value of the resistive component formed in this manner can be more than 10 MΩ. Even if the scanning signal, picture signal or the like is applied to each bus line after the panel is completed, the adjacent bus lines can not be affected due to this high resistive component. Therefore, these high resistive components can be remained in the panel after the panel is completed. Thus, obstacles due to static electricity in the unit assembly process after the panel is completed can be prevented, therefore the liquid crystal display can be fabricated at a much higher yield and the reliability of the display can be improved.

Although this embodiment described that the resistive components with the arbitrary resistance value can be arranged by lining up a plurality of the contact holes 98 linearly between each of the bus lines 2 and 4 and the short ring 20 (the common wiring 22 and 24), this embodiment is not limited to this and as shown in FIG. 26, the structure according to this embodiment can be formed between the adjacent gate bus lines 2 or the adjacent data bus lines 4. In this case, the electrostatic protection circuit can also be remained in the panel after the panel is completed by connecting the areas between the contact holes arranged on the metal layers 200, 202 and the like using the ITO layer and by forming sufficiently high resistive elements. The electrostatic protection element portion according to this embodiment can certainly be formed without changing the fabrication process not only between the adjacent bus lines but also at an arbitrary position requiring the high resistive component.

Further, in the TFT fabrication process, the quality of the panel may be judged by the open/short inspection (O/S inspection) for simply detecting a disconnection/shortage of the bus line without the use of the array inspection. In this case, in order to detect an interlayer shortage, the common wiring 22 of the short ring 20 on the gate bus line 2 side and the common wiring 24 on the data bus line 4 side are required to be separated by the high resistive component. Accordingly, the structure shown in FIG. 27 can be taken as an example. In the area indicated by the dotted lines 120 in FIG. 27, a connecting state of the common wiring 22 of the short ring 20 and the common wiring 24 is shown. As shown in FIG. 27, by connecting a contact hole 121 where the end portion of the common wiring 22 formed by patterning the gate metal layer exposes and a contact hole 122 where the end portion of the common wiring 22 formed by patterning the drain metal layer exposes by the ITO layer 43, the high resistive portion can easily be formed at the end portion of connection. In the formation of the high resistive portion in the contact hole 122, the resistance value can arbitrarily be adjusted by employing the method described in (d) and (e) of FIG. 25 above.

It should be noted that in the embodiment above, although the silicon nitride film is used as the insulation film, a silicon oxide film ($SiO_2$ film) can certainly be used. Also, in the embodiment above, although the ITO is used for the connection layer between the contact holes 98, this embodiment is not limited to this and other materials relatively high in resistance value may certainly be used. Further, although the layered structure of Ti/Al/Ti is used as the drain metal, molybdenum (Mo), tungsten (W), tantalum (Ta) and their alloy, or their nitride oxide can be used instead of Ti for the upper metal layer, and copper (Cu), Al alloy, Cu alloy and the like can be used instead of Al for the middle layer.

It should be noted that the each of the structures described in FIGS. 23 through 27 in the embodiment above can apply to the interlayer separation portion 23 shown in FIG. 22.

As described above, according to this embodiment, since the high resistive component can easily be formed and still the resistance value can be controlled, the device destruction due to static electricity can be prevented and the array inspection can be highly accurately performed as well. Further, since the destruction of static electricity in the unit assembly process can be dealt with after the panel is completed, an increase in production volume owing to the improvement in fabrication yield and still highly reliable display can be provided.

As described above, according to the present invention, the liquid crystal display provided with the electrostatic protection circuit superior in redundancy can be realized. Further, according to the present invention, the liquid crystal display provided with the sufficient protection function against static electricity in which relatively low voltage generates for a long period of time can be realized.

Furthermore, according to the present invention, the liquid crystal display enabling to take measures against static electricity until the final stage of the substrate assembly process can be realized. Also, according to the present invention, the liquid crystal display in which the electrostatic protection element portion does not affect the size of the panel can be realized. Further, according to the present invention, the liquid crystal display having the electrostatic protection element section in which the element structure is simple and not unfavorable in controlling the current can be realized.

What is claimed is:

1. An active matrix type liquid crystal display comprising:
a switching element formed for each of a plurality of pixels defined by a plurality of bus lines; and
an electrostatic protection element portion formed between the adjacent bus lines,
wherein the electrostatic protection element portion comprises a plurality of metal layers directly formed on the same layer, an insulating layer directly formed on the plurality of metal layers so as to completely cover surfaces of the plurality of metal layers, a contact hole formed by opening the insulating layer on the plurality of metal layers, and a connecting layer electrically connecting the metal layers via the contact hole,
wherein the connecting layer is formed of a same material as each pixel electrode in the plurality of pixels, and
further comprising a resistive component of 7 to 8 k$\Omega$ formed between the metal layers and the connecting layer.

2. An active matrix type liquid crystal display according to claim 1, wherein the insulating layer is a single layer.

3. An active matrix type liquid crystal display according to claim 1, wherein the connecting layer is a single layer.

4. An active matrix type liquid crystal display, comprising:
a switching element formed for each of a plurality of pixels defined by a plurality of data bus lines and gate bus lines;
a first common wiring connected to the data bus lines;
a second common wiring connected to the gate bus lines; and
an electrostatic protection element portion formed to be an only connection between the first common wiring and the second common wiring;
wherein the electrostatic protection element portion comprises a plurality of metal layers directly formed on the same layer as the first common wiring or the second common wiring, an insulating layer formed on the plurality of metal layers, a contact hole formed by opening the insulating layer on the plurality of metal layers, and a connecting layer electrically connecting the metal layers via the contact and hole, and
further comprising a resistive component of 7 to 8 k$\Omega$ formed between the metal layers and the connecting layer.

5. An active matrix type liquid crystal display, comprising:
a switching element formed for each of a plurality of pixels defined by a plurality of bus lines;
an electrostatic protection element portion having a multi-layer structured metal layer in which a top layer is partially removed and an under layer directly below the top layer is exposed;
an insulating layer formed on the metal layer;
a contact hole formed by opening the insulating layer on the metal layer; and
a connecting layer electrically connecting the top layer and the under layer of the metal layer via the contact hole, respectively,
wherein a contact resistance between the connecting layer and the metal layer can be increased, and
wherein the contact resistance through the contact hole on the metal layer is equal to 35 to 36 k$\Omega$.

* * * * *